(12) United States Patent
Anderson et al.

(10) Patent No.: US 12,496,846 B2
(45) Date of Patent: Dec. 16, 2025

(54) MASK FOR LOW CONTRAST PRINTED HIGHLIGHTS

(71) Applicant: MIRACLON CORPORATION, Oakdale, MN (US)

(72) Inventors: John Anderson, Pittsburgh, PA (US); Andreas M. Albat, Squamish (CA); Richard R. Bielak, Port Coquitlam (CA)

(73) Assignee: MIRACLON CORPORATION, Oakdale, MN (US)

( * ) Notice: Subject to any disclaimer, the term of this patent is extended or adjusted under 35 U.S.C. 154(b) by 142 days.

(21) Appl. No.: 17/842,494

(22) Filed: Jun. 16, 2022

(65) Prior Publication Data

US 2023/0406023 A1 Dec. 21, 2023

(51) Int. Cl.
*B41N 1/14* (2006.01)
*B41C 1/10* (2006.01)

(52) U.S. Cl.
CPC .............. *B41N 1/14* (2013.01); *B41C 1/1008* (2013.01); *B41C 2210/02* (2013.01)

(58) Field of Classification Search
None
See application file for complete search history.

(56) References Cited

U.S. PATENT DOCUMENTS

| | | |
|---|---|---|
| 3,458,311 A | 7/1969 | Alles |
| 3,794,494 A | 2/1974 | Inoue |
| 4,045,231 A | 8/1977 | Toda |
| 4,177,074 A | 12/1979 | Proskow |
| 4,323,636 A | 4/1982 | Chen |
| 4,323,637 A | 4/1982 | Chen et al. |
| 4,361,640 A | 11/1982 | Pine |
| 4,427,749 A | 1/1984 | Graetzel et al. |

(Continued)

FOREIGN PATENT DOCUMENTS

| | | |
|---|---|---|
| EP | 1182033 B1 | 2/2002 |
| WO | 2004101280 A1 | 11/2004 |

(Continued)

OTHER PUBLICATIONS

International Search Report and Written Opinion of the International Searching Authority dated Feb. 16, 2024 as received in Application No. PCT/US2023/031090.

*Primary Examiner* — Chanceity N Robinson
(74) *Attorney, Agent, or Firm* — Maschoff Brennan

(57) ABSTRACT

A highlight microdot mask element includes: at least one imaged region having at least one imaged block and being optically transmissive; at least one opaque island formed by at least one non-imaged block, wherein an arrangement of the plurality of imaged regions and the at least one opaque island defines the highlight microdot print surface pattern; and an opaque void region surrounds the highlight microdot pattern. A flexographic plate highlight microdot printhead includes: at least one elevated region, each elevated region having at least one elevated block forming a print surface; at least one internal recess formed by at least one recessed block, wherein an arrangement of the plurality of elevated regions and the at least one recess define a the highlight microdot print surface pattern of a highlight microdot structure; and an recess void region surrounding the highlight microdot structure.

16 Claims, 18 Drawing Sheets

(56) References Cited

U.S. PATENT DOCUMENTS

| | | |
|---|---|---|
| 4,430,417 A | 2/1984 | Heinz |
| 4,431,723 A | 2/1984 | Proskow |
| 4,442,302 A | 4/1984 | Pohl |
| 4,460,675 A | 7/1984 | Gruetzmacher |
| 4,517,279 A | 5/1985 | Worns |
| 4,726,877 A | 2/1988 | Fryd |
| 4,753,865 A | 6/1988 | Fryd |
| 4,894,315 A | 1/1990 | Feinberg et al. |
| 4,956,252 A | 9/1990 | Fryd |
| 5,171,650 A | 12/1992 | Ellis et al. |
| 5,208,135 A | 5/1993 | Patel et al. |
| 5,354,645 A | 10/1994 | Schober et al. |
| 5,496,685 A | 3/1996 | Farber et al. |
| 5,496,903 A | 3/1996 | Watanate et al. |
| 6,001,516 A | 12/1999 | Gasper |
| 6,153,356 A | 11/2000 | Urano et al. |
| 6,162,593 A | 12/2000 | Wyatt et al. |
| 6,248,502 B1 | 6/2001 | Eklund |
| 6,259,465 B1 | 7/2001 | Tutt et al. |
| 6,264,920 B1 | 7/2001 | Achilefu et al. |
| 6,309,792 B1 | 10/2001 | Hauck et al. |
| 6,569,603 B2 | 5/2003 | Furukawa |
| 6,582,886 B1 | 6/2003 | Hendrickson et al. |
| 6,787,281 B2 | 9/2004 | Tao et al. |
| 7,802,598 B2 | 9/2010 | Zwadlo et al. |
| 8,771,925 B2 | 7/2014 | Fohrenkamm et al. |
| 8,896,894 B2 | 11/2014 | Anderson, III |
| 9,005,884 B2 | 4/2015 | Yawata et al. |
| 9,067,402 B1 | 6/2015 | Bielak |
| 9,152,897 B1 | 10/2015 | Bielak |
| 9,235,126 B1 | 1/2016 | Bielak |
| 9,375,910 B2 | 6/2016 | Bielak |
| 10,150,319 B1 | 12/2018 | Bielak |
| 10,248,025 B2 | 4/2019 | Ollmann et al. |
| 2005/0227182 A1 | 10/2005 | Ali et al. |
| 2010/0022409 A1 | 1/2010 | Maes et al. |
| 2010/0028815 A1 | 2/2010 | Zwadlo |
| 2010/0068651 A1 | 3/2010 | Bradford |
| 2011/0183260 A1 | 7/2011 | Fohrenkamm et al. |
| 2011/0265676 A1 | 11/2011 | Golan et al. |
| 2014/0076181 A1 | 3/2014 | Anderson, III |
| 2014/0076184 A1 * | 3/2014 | Anderson, III ......... B41F 13/12 101/485 |
| 2018/0354288 A1 * | 12/2018 | Bielak ................... G03F 7/2016 |
| 2020/0016916 A1 | 1/2020 | Sievers et al. |
| 2020/0254749 A1 * | 8/2020 | Blomquist .............. G03F 7/202 |

FOREIGN PATENT DOCUMENTS

| | | | |
|---|---|---|---|
| WO | 2018/226409 A1 | 12/2018 | |
| WO | WO-2020245290 A1 * | 12/2020 | .......... H04N 1/4055 |
| WO | 2023/073232 A1 | 5/2023 | |

\* cited by examiner

250μm

100μm

MASK FOR LOW CONTRAST PRINTED HIGHLIGHTS

BACKGROUND

Field

The present disclosure relates to a mask for a flexographic printing plate precursor, an imaging assembly having the mask, and a flexographic printing plate having the pattern of the mask, as well as methods of making and using the same. More particularly, the present disclosure relates to flexographic printing of highlight regions that have highlight dots with pattern print heads and the masks, assemblies, and flexographic printing plates having the same or corresponding highlight dot feature.

Description of Related Art

In graphic arts technology, a number of well-established printing processes utilize image carriers with a three-dimensional (3D) representation of image data. The most popular printing being flexographic printing, which uses flexible relief plates or sleeves with elevations and recesses to have the 3D representation of image data. A relief plate includes raised relief features, which are raised above the plate floor, and spaces between the raised features can present as recesses that are the same elevation as the plate floor or a dimension lower than the top of the raided relief features. Often, the surface of the raised relief surface is constant across a plurality of raised features. It is the raised features that accept and transfer ink to the substrate. These raised features are often called dots or dot structures in the flexographic printing plate. In a traditional flexographic prepress process with chemical etching, there is no possibility of fine control of relief properties other than the distance between the dot structures and the relief depth between or around dot structures.

Flexographic printing uses a flexible relief plate 20 to print on a wide variety of substrates including paper, cardboard, plastic, and metal films. A simplified diagram of a flexographic printing press is shown in FIG. 1. Ink 10 in a fountain pan 26 is taken up by a rubber fountain roller 12 and transferred to the surface of the anilox roller 14. The surface of the anilox roller 14 is composed of an array of indented cells that allow careful metering of the ink volume. A doctor blade 16 removes any excess ink 10 from the anilox roller 14 before the ink 10 is transferred to the printing plate cylinder 18. Mounted on the plate cylinder 18 is a flexographic printing plate 20, which can also be referred to as a flexible relief plate. The final step transfers the ink 10 from the plate 20 to substrate 22, with impression cylinder 24 supplying support for the substrate 22.

An embodiment of the flexographic printing plate 20 of FIG. 1 can be seen in FIG. 2 as plate 200. The plate 200 is shown to include: a solid area raised feature 204; an isolated dot raise feature 208; and a raised feature 212 including an array of closely spaced dots created by a halftone screen. The height of the plate relief above the plate floor 220 is shown by relief depth 216. For every opening in the image layer, a cone of UV light (typically with an angle of about 40 degrees from a normal to the plane) propagates through the plate 20 forming cone-shaped relief dots of 208 and 212. The spacing of the dot structures in the array of raised feature 212 can be spaced apart sufficiently such that a highlight region may be printed. However, the printed highlight region may still show the individual dots due to deficiencies in flexographic printing of highlight regions that fade to zero visibility in images.

The process used to produce an image on a flexible relief plate 20 typically includes the following steps: Expose the back of the plate to UV light (step 1); Expose an intermediate film to the desired image (step 2); Laminate the file to the top of the plate (step 3); Expose the plate through the film using UV Light (step 4); Remove the film (step 5); Use a solvent to wash away the unexposed plate material (step 6); Apply additional exposure to harden the plate (step 7); and Dry the plate to remove as much solvent as possible (step 8).

The back exposure in step 1 is used to establish the floor 220 of the plate 20, as shown in FIG. 2, which is a cross section of an exemplary plate 20. The intensity of the exposure decreases as the illumination penetrates the plate because of absorption in the plate material. Once the intensity drops below a threshold value, there is insufficient cross linking in the polymer comprising the plate, and the remaining under-exposed polymer can be washed away. This is typically the top 0.5 mm of the plate. To form the relief, the front of the plate is exposed through an image layer with enough intensity so that sufficient cross-linking occurs all the way down to the plate floor 220.

In flexographic printing, the tonal range of an image is created by proportional ink coverage using a halftone screen. FIG. 3 shows a halftone screen 300 with a tonal range that varies from 0% at tone 310 to 100% at tone 320. The small halftone dots at tone 310 are called highlight dots.

Under practical printing conditions, with components and values typically used in flexographic printing for process color and spot color inks, the aim is to produce structured highlight dots that print a highlight image with individual highlight dots that are of low visibility to the human eye, that at normal viewing distances are low contrast and less noticeable to the packaging viewer. The highlight image may fade to zero visibility. With flexographic printing using the raised printing surface of dot structures, ink tends to be pushed off the top of the dot in the printing process, resulting in dots that are larger than the size of the dot structure on the plate. There is a threshold point when the dots in the lowest dot area percentages, start to become visible to the human eye under normal observer conditions. With normal observer distance being arms-length for packaging, the dot size that becomes viewable is typically in the 50-60 micron range.

However, the eye's resolution is limited, which determines how close two objects can become before they blur into one. It is thought that humans can resolve two lines about 0.01 degrees apart: a 0.026 mm gap, 15 cm from the face. In practice, objects 0.04 mm (40 µm) wide (the width of a fine human hair) are just barely distinguishable by good eyes, objects 0.02 mm wide are not distinguishable (sciencefocus.com/the-human-body/how-small-can-the-naked-eye-see/). Accordingly, a 40 micron dot may be just distinguishable by good eyes, by 50-60 microns the dot may be visible by good eyes but just distinguishable by bad eyes. This explains why halftone dots of around 40 microns are barely visible to the human eye, at a focus distance of 280 mm (11"), but when these dots exceed 50-60 microns they become highly visible. This dot size viewability has an impact on printing highlight regions in flexographic printing. The visibility of a dot can cause the highlighting to look polka dotted.

On the other hand, the rotogravure printing process consists of a copper coated cylinder, indented with cells that carry the ink to be printed, but use many smaller dots, that instead of growing shrink during printing, as ink resists spreading. Gravure prints small dots that are very low in contrast, that fool the eye, as a type of illusion, that the print fades to zero without any visual dots to the human eye at a normal observer distance. Gravure prints small dots that appear to be lighter in contrast, because the cell walls of each dot tend to hold or retain the ink, only allowing a small part of the ink to actually transfer, increasing in percent size as the cell size increases.

Flexographic printing attempts to print small dots for highlight regions, but the physical properties and limitations of the process of using dot structures to print can be problematic. The trend has been to use smaller dot structures and less density of dot structures for printing highlight regions in images. However, it has been found that once a printing dot structure is too small, a donut shape or ring can form on the printed doth. The donut shape or ring can form when printed dot growth occurs by the dot structure head pressing the ink into a halo, which appears as a donut or ring. The printing of a donut can result due to high contrast as the ink builds up in an outer ring. This results in difficulty in the ability of flexographic printing of highlight regions to fade to zero visibility. Observing a visible edge at the transition point, caused by the printed dot growth, shows a visible ring that goes against the needs of printing a highlight region, which can fad to zero visibility in optimal printing.

FIG. 4A shows gravure printed dots compared to flexographic (flexo) printed dots at 200 times magnification. The flexo printed dots are printed by microdot structures with a dimension of 25 microns; however, the spreading and donut or ring shape formation of these small dots make the dimension of the printed dot to appear to be about 45 microns, which is obvious to the eye as a donut or ring shape. However, the gravure printed dots appear faded or softer to the eye. At 1%, there are about 12 flexo dots, with the gravure having a print tone of 3.3% and the flexo having a print tone of 3.1%. At 4% there are about 25 flexo dots, with the gravure having a print tone of 4.6% with the flexo having a print tone of 4%. The trend is similar for 3% and 4% with the gravure appearing faded or light with the flexo printing a lot of halo dots. FIG. 4B shows the 1% tone with gravure and flexo to illustrate the significant donut or ring shape of the flexo microdots, which is unfavorable. There are over 20 gravure dots compared to 4 flexo dots, which shows the comparison. Accordingly, making smaller highlight dot structures for printing highlight regions does not appear to be suitable for the resulting highlight images because the donut shape of the flexo printed highlight microdots is visible.

Flexographic printing requires a minimum dot size in order to allow the UV light energy into the plate to cure the photopolymer to form the dot structure correctly. So, there are limitations on how small highlight dot structures can be. Moreover, the donut effect causes problems with small printed dots resulting in unfavorable visually obvious small donut dots. Flexographic printing tends to use smaller dot structures for highlight regions in an image, but those dot structures can be so small that they don't fully form correctly on plate. The small size can make the microdot structure unstable. Also, the small size can make the printed microdots grow more in size to show up visually as donuts.

Previously, dot structures and dot patterns on a flexographic printing plate have been investigated for improvements in print image quality. U.S. Pat. No. 8,896,894 teaches structured microdots, and methods of making and using the same. U.S. Pat. No. 9,067,402 teaches methods for forming flexographic printing plates. U.S. Pat. No. 9,152,897 teaches flexographic printing systems and digital image generation for printing. U.S. Pat. No. 9,235,126 teaches methods of forming flexographic printing plates that use fine patterns of dots in edge regions of images and course patterns to interior regions of the images. U.S. Pat. No. 9,375,910 teaches digital front end for identifying pixels in a halftone image as being part of an edge region or interior region based on pixel proximity to an image edge feature. U.S. Pat. No. 10,150,319 (WO 2018/226409) teaches how to use gaps between fine texture patterns (edge region) and course texture patterns (interior regions). U.S. Publication No. 2010/0224091 teaches a trailing edge pattern for relief to reduce trailing edge inking voids.

In view of the deficiencies in flexographic printing of highlight regions that can print donut dots instead of fade to zero visibility, improvements in flexographic printing plates are desirable that result in better highlight image with better fading to zero visibility.

SUMMARY

In some embodiments, a highlight microdot mask element can include a plurality of imaged regions arranged in a highlight microdot print surface pattern. Each imaged region can have at least one imaged block that is optically transmissive. The highlight microdot mask element can also include at least one opaque island formed by at least one non-imaged block located within the highlight microdot print surface pattern, wherein an arrangement of the plurality of imaged regions and the at least one opaque island define a highlight microdot pattern. Also, the highlight microdot mask element can include an opaque void region surrounding the microdot pattern formed by a plurality of non-imaged blocks. The blocks are arranged in a grid pattern, with the sides of each block being in the grid. The blocks have a height in one direction and a width in the orthogonal direction. The blocks can be rectangular or square when the sides are even. While the imaged blocks can form a recess, aperture (e.g., optical aperture), or optical pathway from the imaging process, the non-imaged blocks in the mask are opaque or not optically transmissive and not forming any optical pathway. In some aspects, each imaged block or non-imaged block has a height of one pixel and a width of ¼ pixel. Each pixel is about 10 microns to about 11 microns in height and width (e.g., substantially square). In some aspects: a width of each imaged region is at least a ¼ pixel; a height of each imaged region is at least 1 pixel; a width of the microdot pattern ranging from 2 pixels to 8 pixels; a height of the microdot pattern ranging from 3 pixels to 8 pixels; a width of each internal opaque island is at least a ¼ pixel; and a height of each internal opaque island is at least 1 pixel. In some aspects: a width of at least one imaged region is at least a ½ pixel; a height of at least one imaged region is at least 2 pixels; the width of the microdot pattern ranging from 2.5 pixels to 4 pixels; the height of the microdot pattern ranging from 4 pixels to 6 pixels; a width of at least one internal opaque island is at least a ½ pixel; and a height of at least one internal opaque island is at least 2 pixels with each non-imaged block touching another imaged block by at least a ¼ pixel.

In some embodiments, a highlight microdot mask element can include: the plurality of imaged regions form a plurality of outer boundary regions that together form an outer boundary pattern, each outer boundary region having at least one imaged block and being optically transmissive; the at least one internal opaque island is formed by at least one non-imaged block located within the outer boundary pattern; and the opaque void region surrounds the outer boundary pattern. In some aspects, each imaged block or non-imaged block has a height of one pixel and a width of ¼ pixel, each pixel is about 10 microns to about 11 microns in height and width.

In some embodiments, the highlight microdot mask element can include: the plurality of outer boundary pixel regions form a continuous annular boundary region with each imaged block touching another imaged block by at least a corner. In some embodiments, the plurality of outer boundary pixel regions form a discontinuous annular boundary region with at least one gap non-imaged block between two adjacent imaged blocks of the plurality of outer boundary pixel regions.

In some embodiments, the highlight microdot mask element can include: a width of each outer boundary pixel region is at least a ¼ pixel; a height of each outer boundary pixel region is at least 1 pixel; a width of the outer boundary pattern ranges from 2 pixels to 8 pixels; a height of the outer boundary pattern ranges from 3 pixels to 8 pixels; a width of each internal opaque island is at least a ¼ pixel; and a height of each internal opaque island is at least 1 pixel. In some aspects: a width of at least one outer boundary pixel region is at least a ½ pixel; a height of at least one outer boundary pixel region is at least 2 pixels; a width of the outer boundary pattern ranges from 2.5 pixels to 4 pixels; a height of the outer boundary pattern ranges from 4 pixels to 6 pixels; a width of at least one internal opaque island is at least a ½ pixel; and a height of at least one internal opaque island is at least 2 pixels with each non-imaged block touching another non-imaged block by at least a ¼ pixel.

In some embodiments, the highlight microdot mask element can include at least one of: a single internal opaque island within a continuous annular boundary region; a single internal opaque island within a discontinuous annular boundary region; a plurality of internal opaque island within a continuous annular boundary region; or a plurality of internal opaque islands within a discontinuous annular boundary region. In some aspects, he highlight microdot mask element of claim 4, comprising at least one of: a single internal imaged region within a continuous annular boundary region; a single internal imaged region within a discontinuous annular boundary region; a plurality of internal imaged regions within a continuous annular boundary region; or a plurality of internal imaged regions within a discontinuous annular boundary region. In some aspects, the highlight microdot mask element can include at least one of: at least 20 total blocks; at least 16 imaged blocks in the pattern; at least 4 non-imaged blocks in the at least one internal opaque island; or at least 20% of total blocks are non-imaged blocks.

In some embodiments, the highlight microdot mask element can include: the plurality of outer boundary regions that together form an optically transmissive ring; at least one internal opaque island formed by a plurality of non-imaged blocks located within the optically transmissive ring, the internal opaque island having an island width of at least ½ pixel and an island height of at least 2 pixels; and the opaque void region surrounding the optically transmissive ring.

In some embodiments, a mask for highlight-producing flexographic printing plates can include the highlight microdot mask element of one of the embodiments, and an image pattern having a highlight mask region with the highlight microdot mask element. In some aspects, the mask can include: a highlight microdot region of an imaged material with a thermally-ablatable imaging layer having the imaged blocks and non-imaged blocks that are arranged to form a highlight dot pattern on a single highlight microdot, the single highlight microdot comprising the highlight microdot mask element. In some aspects, the mask can include: an optically transmissive ring formed by a plurality of imaged blocks with a thickness of the ring being at least a ¼ pixel and an orthogonal thickness of at least 1 pixel, a ring height ranging from 3 pixels to 8 pixels, and a ring width ranging from 1 pixels to 8 pixels; at least one internal opaque island formed by a plurality of non-imaged blocks located within the optically transmissive ring, the internal opaque island having an island height of at least 1 pixel and an island width of at least 1 pixel; and the opaque void region surrounds the optically transmissive ring.

In some embodiments, the mask can include: an imaged material with a thermally-ablatable imaging layer having imaged blocks and non-imaged blocks that are arranged to form the image pattern. The image pattern includes at least one highlight mask region that has a plurality of highlight dot regions that form a highlight pattern in the image pattern. The highlight mask region includes a plurality of opaque regions of the thermally-ablatable imaging layer. Each opaque region being one or more non-imaged blocks. The highlight mask region includes a plurality of optically-transmissive regions in the thermally-ablatable imaging layer. Each optically-transmissive region can be one or more imaged blocks, wherein each highlight dot region includes at least one highlight microdot mask element.

In some embodiments, the mask can include: an optically transmissive ring formed by a plurality of imaged blocks with a thickness of the ring being at least a ¼ pixel, a ring height ranging from 4 pixels to 8 pixels, and a ring width ranging from 2 pixels to 8 pixels; an internal opaque island formed by a plurality of non-imaged blocks located within the optically transmissive ring, the internal opaque island having an island width of at least 1 pixel and an island height of at least 2 pixels; and an opaque void region surrounding the optically transmissive ring formed by a plurality of non-imaged blocks.

In some embodiments, a method of forming a mask for highlight-producing flexographic printing plates can include: providing an imageable material having a thermally-ablatable imaging layer; providing an image pattern having at least one highlight region, wherein the highlight region includes a plurality of highlight microdot mask elements, wherein each highlight microdot mask element includes a microdot pattern formed by an arrangement of a plurality of imaged regions and at least one opaque island; and imaging the imageable material to form a mask image in the thermally-ablatable imaging layer. In some aspects, the mask image includes the image pattern having the at least one highlight region. In some aspects, the highlight region includes the plurality of highlight microdot mask elements. In some aspects, each highlight microdot mask element includes the microdot pattern formed by a plurality of imaged blocks in the thermally-ablatable imaging layer and the at least one opaque island of the thermally-ablatable imaging layer is formed by at least one non-imaged block. The imaged blocks and non-imaged blocks are arranged together to form the microdot pattern in the mask image, wherein an opaque void region formed by a plurality of non-imaged blocks surrounds the microdot pattern.

A flexographic plate highlight microdot printhead comprising: a plurality of elevated regions arranged in a highlight microdot print surface pattern, each elevated region having at least one elevated block forming a print surface; at least one internal recess formed by at least one recessed block located within the highlight microdot print surface pattern, wherein an arrangement of the plurality of elevated regions and the at least one recess define a microdot pattern of a microdot; and a recess void region surrounding the microdot pattern formed by a plurality of recess blocks, wherein each recess block has a recess surface lower than each print surface. In some aspects, each elevated block or recessed block has a height of one pixel and a width of ¼ pixel, each pixel is about 10 microns to about 11 microns in height and width. In some aspects: a width of each elevated region is at least a ¼ pixel; a height of each elevated region is at least 1 pixel; a width of the microdot pattern ranges from 2 pixels to 8 pixels; a height of the microdot pattern ranges from 3 pixels to 8 pixels; a width of each internal recess is at least a ¼ pixel; and a height of each internal recess is at least 1 pixel. In some aspects: a width of at least one elevated region is at least a ½ pixel; a height of at least one elevated region is at least 2 pixels; the width of the microdot pattern ranging from 2.5 pixels to 4 pixels; the height of the microdot pattern ranging from 4 pixels to 6 pixels; a width of at least one internal opaque island is at least a ½ pixel; and a height of at least one internal opaque island is at least 2 pixels with each non-imaged block touching another non-imaged block by at least a ¼ pixel.

In some embodiments, the flexographic plate highlight microdot printhead can include: the plurality of elevated regions form a plurality of outer boundary regions that together form an outer boundary pattern, each outer boundary region having at least one elevated block forming a print surface; the at least one internal recess is formed by at least one recess block located within the outer boundary pattern; and the recess void region surrounds the outer boundary pattern. In some aspects, each elevated block or recessed block has a height of one pixel and a width of ¼ pixel, each pixel is about 10 microns to about 11 microns in height and width.

In some embodiments, the flexographic plate highlight microdot printhead can include: the plurality of outer boundary regions form a continuous annular boundary region with each elevated block touching another elevated block by at least a corner. In some embodiments, the plurality of outer boundary regions form a discontinuous annular boundary region with at least one gap recessed block between two adjacent elevated blocks of the plurality of outer boundary regions. In some aspects: a width of each outer boundary region is at least a ¼ pixel; a height of each outer boundary region is at least 1 pixel; a width of the outer boundary pattern ranging from 2 pixels to 8 pixels; a height of the outer boundary pattern ranging from 3 pixels to 8 pixels; a width of each internal recess block is at least a ¼ pixel; and a height of each internal recess block is at least 1 pixel. In some aspects: a width of at least one outer boundary region is at least a ½ pixel; a height of at least one outer boundary region is at least 2 pixels; a width of the outer boundary pattern ranges from 2.5 pixels to 4 pixels; a height of the outer boundary pattern ranges from 4 pixels to 6 pixels; a width of at least one internal recess block is at least a ½ pixel; and a height of at least one internal recess block is at least 2 pixels with each recess block touching another recessed block by at least a ¼ pixel.

In some embodiments, the flexographic plate highlight microdot printhead can include at least one of: a single internal recess region within a continuous annular boundary region; a single internal recess region within a discontinuous annular boundary region; a plurality of internal recess regions within a continuous annular boundary region; or a plurality of internal recess regions within a discontinuous annular boundary region.

In some embodiments, the flexographic plate highlight microdot printhead can include at least one of: a single internal elevated region within a continuous annular boundary region; a single internal elevated region within a discontinuous annular boundary region; a plurality of internal elevated regions within a continuous annular boundary region; or a plurality of internal elevated regions within a discontinuous annular boundary region.

In some embodiments, the flexographic plate highlight microdot printhead can include at least one of: at least 20 total elevated blocks and recess blocks; at least 16 elevated blocks in the pattern; at least 4 recess blocks in the at least one recess region; or at least 20% of total blocks are recess blocks.

In some embodiments, the flexographic plate highlight microdot printhead can include: the plurality of outer boundary regions together form a print surface ring; at least one internal recess region formed by a plurality of recess blocks located within the print surface ring, the internal recess region having a width of at least ½ pixel and a height of at least 2 pixels; and the recess void region surrounds the print surface ring.

In some embodiments, a flexographic printing plate can include: the highlight microdot printhead of one of the embodiments, and an image pattern having a highlight region with the highlight microdot printhead. In some aspects, the flexographic printing plate can include a highlight microdot region of a relief imaged material with a relief-forming layer having the elevated blocks and recess blocks that are arranged to form a highlight dot pattern on a single highlight microdot, the single highlight microdot comprising the highlight microdot printhead.

In some embodiments, the flexographic printing plate can include the highlight microdot printhead of one of the embodiments, and an image having a highlight region with the highlight microdot printhead.

In some embodiments, the flexographic printing plate can include: a print surface ring formed by a plurality of elevated blocks with a thickness of the ring being at least a ¼ pixel and an orthogonal thickness of at least 1 pixel, a ring height ranging from 3 pixels to 8 pixels, and a ring width ranging from 1 pixels to 8 pixels; the at least one internal recess region formed by a plurality of recess blocks located within the print surface ring, the internal recess region having a height of at least 1 pixel and a width of at least 1 pixel; and the recess void region surrounds the print surface ring.

In some embodiments, the flexographic printing plate can include a relief imaged material with a relief-forming layer having elevated blocks and recess blocks that are arranged to form the image pattern. The image pattern includes at least one highlight region that has a plurality of highlight microdots that form a highlight pattern in the image pattern. Each highlight microdot includes a plurality of recess regions of the relief forming layer. Each recess region can be one or more recessed blocks. Each highlight microdot includes a plurality of elevated regions in the relief-forming layer. Each elevated region can be one or more elevated blocks, wherein the elevated blocks of the highlight microdot each have a print surface.

In some embodiments, the flexographic printing plate can include: a print surface ring formed by a plurality of elevated blocks with a thickness of the ring being at least a ¼ pixel, a ring height ranging from 4 pixels to 8 pixels, and a ring width ranging from 2 pixels to 8 pixels, the internal recess region is formed by a plurality of recessed blocks located within the print surface ring, the internal recess region having a width of at least 1 pixel and a height of at least 2 pixels; and the recess void region surrounds the print surface ring and is formed by a plurality of recessed blocks.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and following information as well as other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

Figure 1:
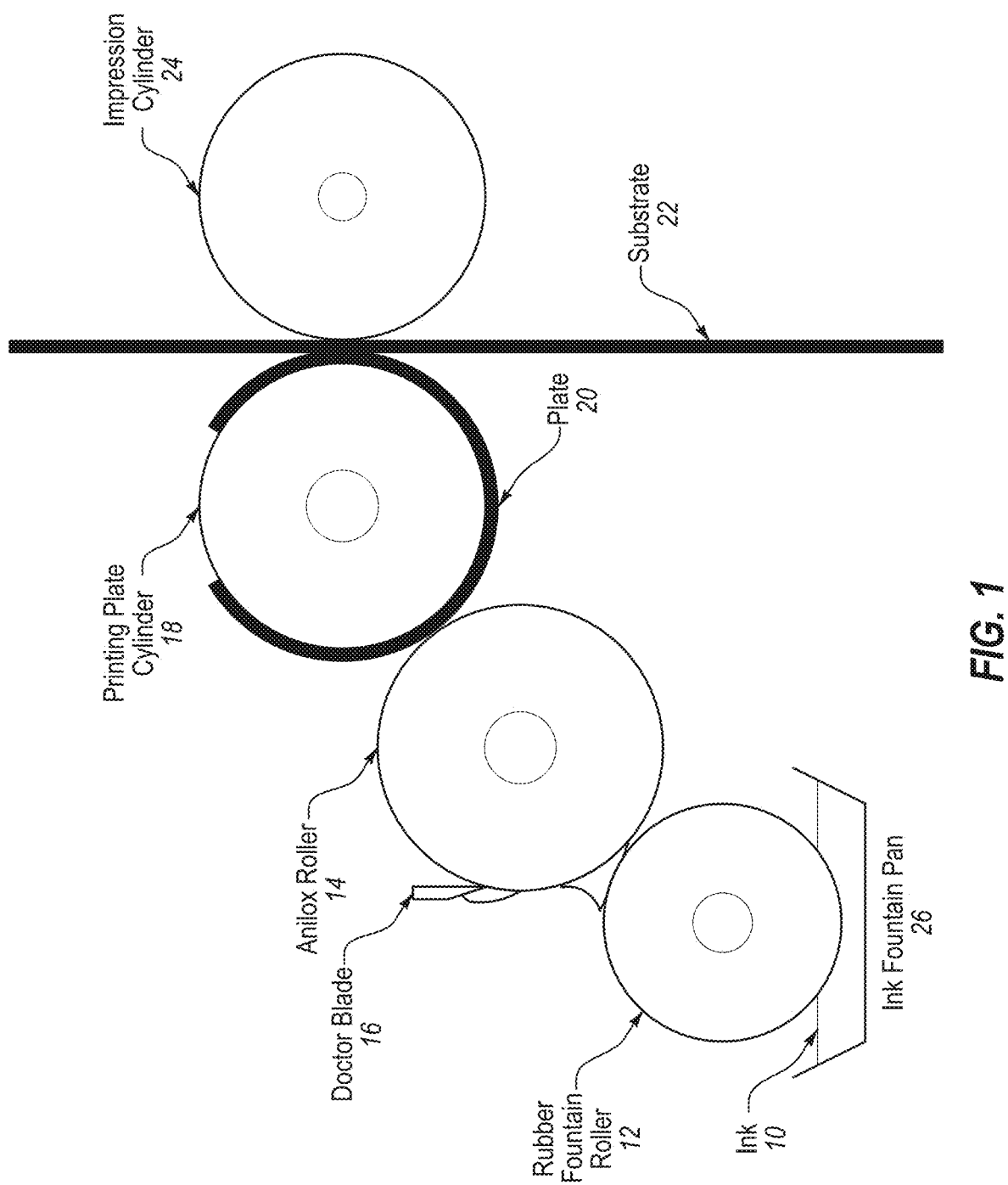
FIG. 1 is a schematic representation of a flexographic printing system and process.

The elements and components in the figures can be arranged in accordance with at least one of the embodiments described herein, and which arrangement may be modified in accordance with the disclosure provided herein by one of ordinary skill in the art.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Generally, the present technology relates to the flexographic printing plates that are used for forming highlight images with highlight regions, where the highlight region may optionally fade to zero visibility region. The flexographic printing plate can include the highlight microdot structures in a highlight pattern that cooperate to form the flexographic highlight image that can fade to about zero visibility. The present technology also relates to the masks that are used for producing the flexographic printing plates with the highlight pattern of highlight microdot structures. The present technology also relates to the methods for designing and making the masks and flexographic printing plates. The present technology also includes methods of using the flexographic printing plates to produce printed images with highlight region, which optionally fade to zero highlight visibility, by flexographic printing. For example, the present technology relates to the Flexcel NX system of Miraclon.

Figure 2:
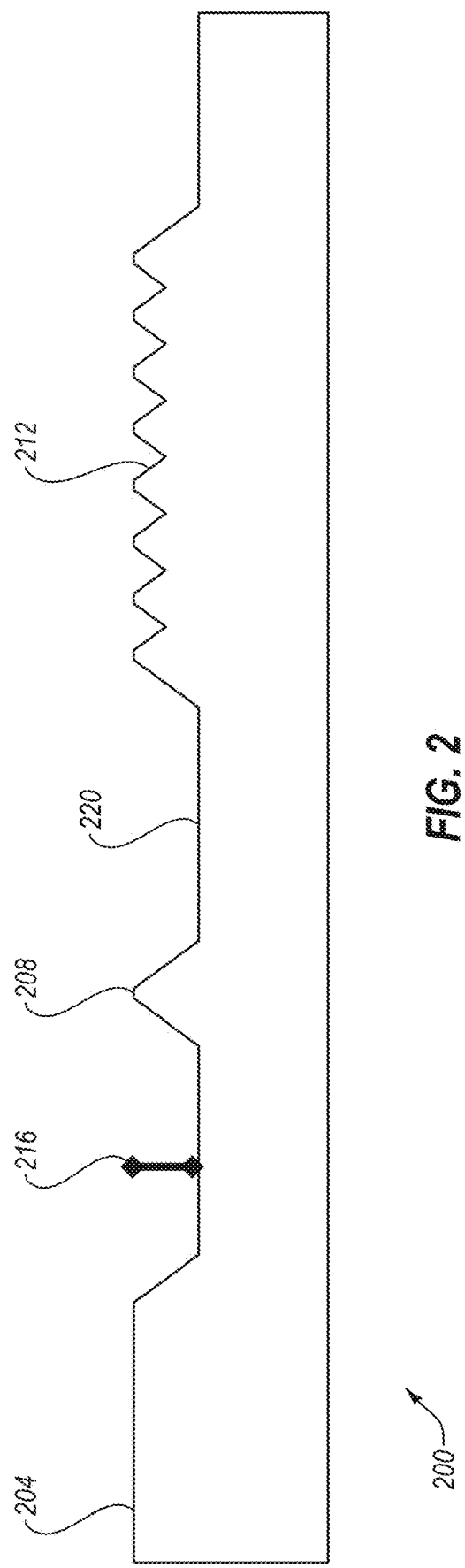
FIG. 2 is a cross-sectional schematic illustration of an embodiment of a flexographic printing plate.

The highlight microdot structures of the flexographic printing plate can be formed as elevations with a printing surface pattern that can form a portion of a highlight region, with a plurality of such highlight microdot structures forming a highlight image. FIG. 2 can be used to show a representative microdot structure with the elevations (e.g., 208 of above the floor 220). The highlight microdot structures are useful for flexographic printing highlight images in a manner that reduces the visibility of each individual printed highlight microdot. The highlight microdot structures include a print surface pattern that prints onto a surface with low visibility. In some aspects, the printed highlight dot can even grow larger than the normal visual threshold under a normal observation distance and still maintain appearing as a highlight and not an individual dot. For standard comparisons, a highlight region for a flexographic printing plate can include highlight microdot structures at 5% or less of the highlight image area. The shape and features of each highlight microdot structure as well as the highlight region are defined by the mask that is used to prepare the flexographic printing plate. As such, the design of the mask is made so as to be usable to produce the flexographic printing plate with the highlight region.

Figure 4A:
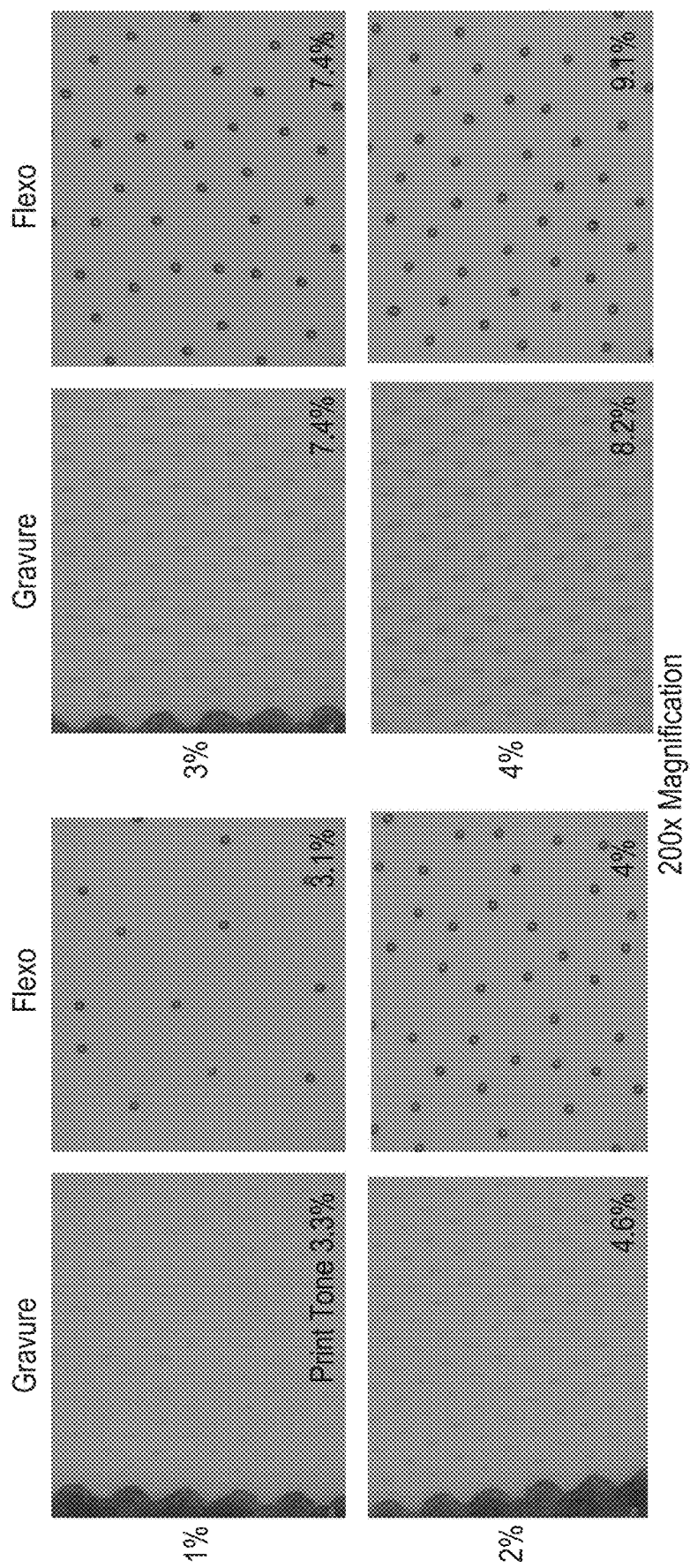
FIG. 4A includes images of gravure printing dots compared to flexographic printing visible dots.
Figure 4B:
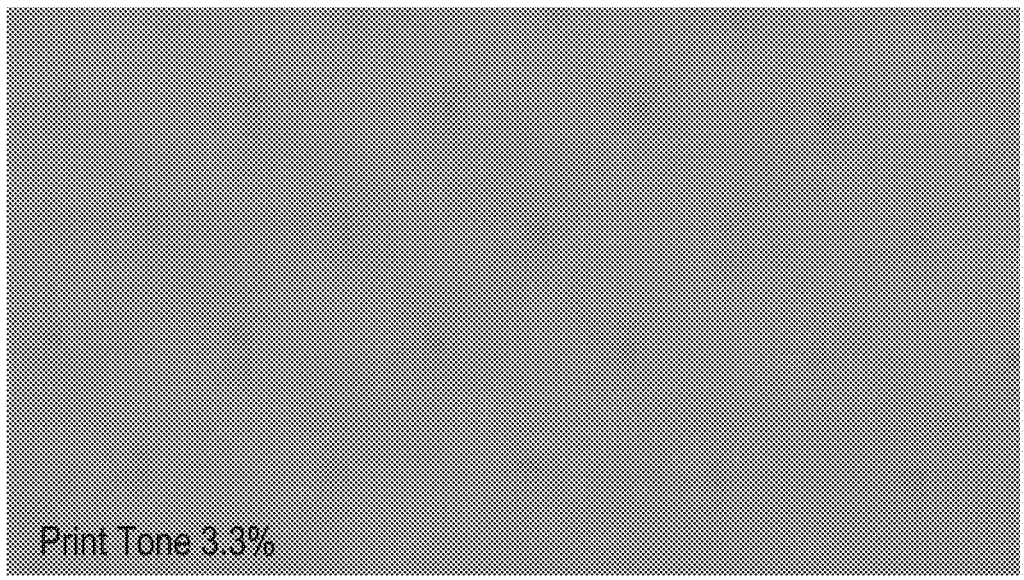
FIG. 4B is a magnification of an FIG. 4A.
Figure 4B:
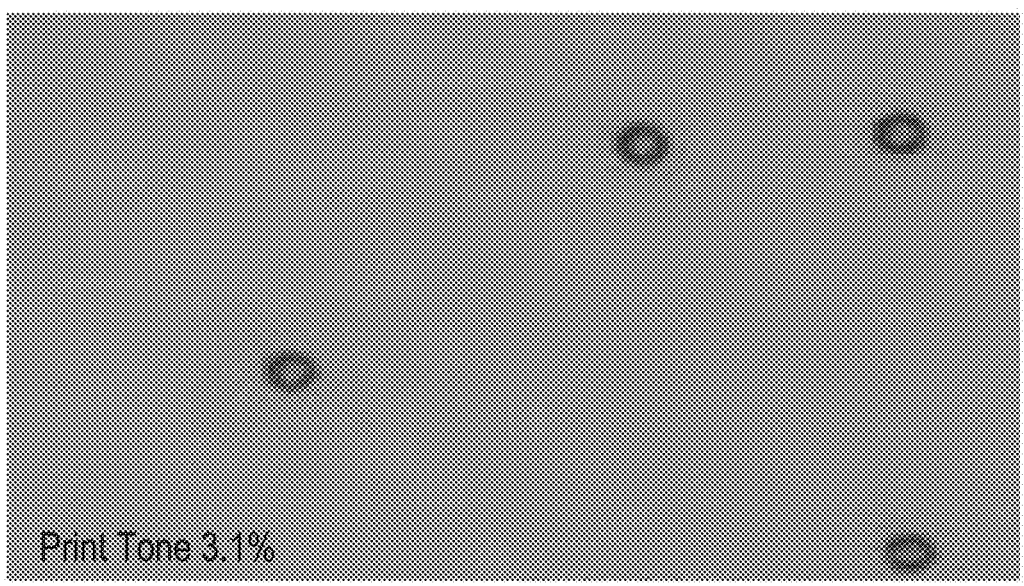

In some embodiments, the highlight microdot structures, which are defined herein as having the highlight microdot pattern on the printhead, are configured to overcome halo effects from microdots that are too small or omit highlight microdot printhead patterns. For example, when gravure printing is compared to prior flexographic printing for highlights it is clear that the gravure dot is different from the flexographic dot (e.g., 35 microns). FIGS. 4A-4B show gravure printed dots compared to flexographic (flexo) printed dots as described above. The flexo printed dots are microdots with a dimension of microns; however, the spreading and donut shape formation of these small dots makes the dimension appear to be about 45 microns, which is obvious to the eye as a donut shape. However, the gravure printed dots appear faded or softer to the eye.

Figure 4C:
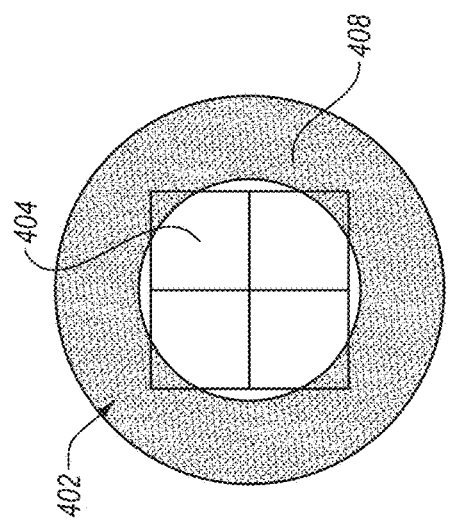
FIG. 4C is a schematic representation of flexographic printing a highlight dot that has a donut shape.
Figure 4C:
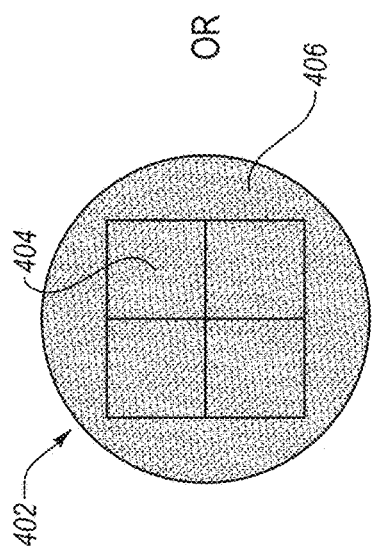
Figure 4C:
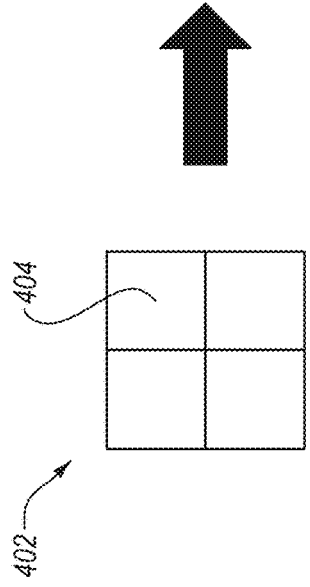

FIG. 4C shows a schematic illustration of how the flexo microdot structure with a small printhead (e.g., size 35 micron or less) forms the donut shape. The microdot 402 is configured as a pixel 404 or group of 4 pixels as shown. These pixels 404 can print as a solid dot 406 when large enough (e.g., over 100 microns) or can print as a halo or donut dot 408 from the printhead pushing the ink outwardly when small enough (e.g., less than microns). The donut dot is unfavorable in highlight printing.

Figure 4D:
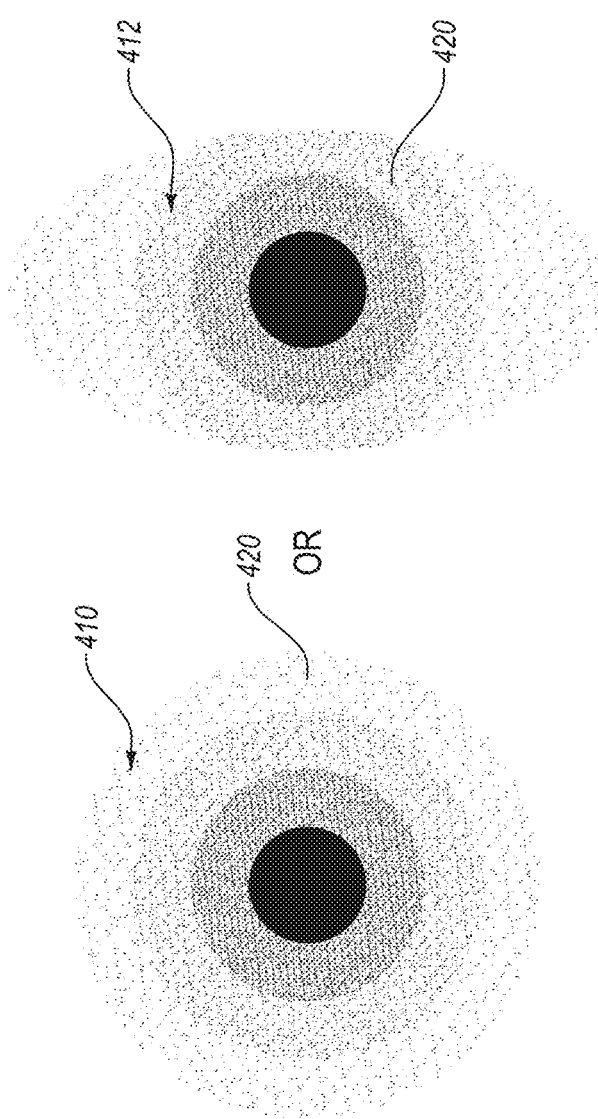
FIG. 4D is a schematic representation of flexographic printing a highlight dot that has a gradient coloring that is darker in the middle that lightens and becomes less visible moving outwardly.
Figure 4D:
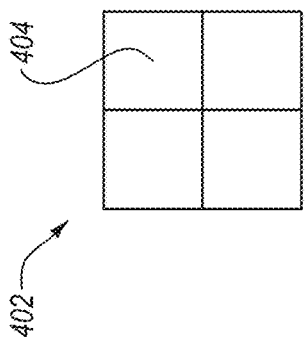

FIG. 4D shows a schematic illustration of how the flexo microdot structure with a patterned microdot printhead (e.g., greater than size 35 microns with a print surface pattern) forms the faded print dot 420. The microdot 402 is configured as a pixel 404 or group of pixels as shown, however, the pattern is omitted for clarity. The highlight microdot pattern can be reviewed in FIGS. 5A-5D. These pixels 404 can print as a faded print dot 420 in a circle 410 or an oval 412 from the printhead pushing the ink outwardly from the patterned microdot printhead. The patterned microdot printhead avoids the donut dots of FIG. 4C.

Masks

In order to prepare a flexographic printing plate having the highlight image of highlight microdots, a mask is first generated with the desired pattern. A mask is created to have a negative image compared to the flexographic printing plate. Where the mask includes optical apertures, the curing light is allowed through the mask to cure the flexographic printing plate material. As such, the pattern of the mask indicates the pattern of the flexographic printing plate; however, the optically transmissive regions of the mask correspond with the elevated structures on the flexographic printing plate and the optically opaque regions of the mask correspond with the recess structures on the flexographic printing plate. The following figures are provided to show examples of the patterned microdot printheads by showing the pattern that is for the mask and resulting flexographic printing plate.

FIGS. 5A-5D show example microdot printhead patterns 500, which are in the form of an arbitrary grid 502 of blocks 504. The figures show the printhead template as 5 blocks in height and 16 blocks in width; however, either height or width may vary such as 4 blocks to 6 blocks in height and 10 to 20 blocks in width. As show herein, each block is 1 pixel in height and ¼ pixel in width, and thereby 4 blocks horizontally connected form a pixel. The blocks are designated either as print blocks 506 or blank blocks 508. The print blocks 506 correspond with an optically-transmissive block in a mask element, and correspond with an elevated structure or print surface in a flexographic printing plate. The blank blocks 508 correspond with an optically-opaque block in a mask element, and correspond with a recess or void space in a flexographic printing plate. For the purposes of illustration, the grids 502 of FIGS. 5A-5D are in a mask element 510. The mask element 510 can correspond with a highlight region of an image. Each microdot printhead pattern 500 is labeled with an identifier, such as patterns 4A, 4B, 4C, 5A, 5B, 5C, 5D, and in FIG. 5A; patterns 5F, 5G, 5H, SI, 5Q1, 5Q2, 5Q3, and 5Q4 in FIG. 5B; patterns 5Q06, 5Q07, 5Q08, 5Q09, 5Q10, 5Q11, and 5Q12 in FIG. 5C, and patterns 5Q13, 5Q15, and 5Q16 in FIG. 5D.

The grids 502 allow for any block 504 to be selected as either print blocks 506 or blank blocks 508. The print blocks in the mask element 510 allow light, such as UV light, to pass therethrough to form the corresponding structure on a flexographic printing plate. The print blocks in the mask element 510 are formed by imaging an imageable layer of a mask material. These protocols are described in detail herein. In some aspects, the pattern can include a single print block 506 without an adjacent print block 506, which is shown as a single print block 506 with all adjacent blocks 504 (e.g., vertically or horizontally) being blank blocks 508. In some aspects, the pattern 500 can include a single blank block 508 without an adjacent blank block 508, which is shown as a single blank block 508 with all adjacent blocks (e.g., vertically or horizontally) being print blocks 506.

The single block 504 can be referred to as a ¼ pixel (e.g., quarter pixel) block. In some aspects, the pattern can include a pair horizontally-adjacent of print blocks 506 as the smallest segment of blocks 504, or a pair of blank blocks 508 as the smallest segment of blocks 504, which can be referred to as ½ pixel (e.g., half pixel) block. Following these rules allows for the mask to be prepared in one laser pass for full speed and least risk of defects. Some patterns can include ¼ pixel blocks and ½ pixel blocks as well as ¾ and 1 pixel blocks. Any combination of one or more horizontally adjacent ¼ pixel blocks can be used.

The mask element 510 can be a highlight microdot mask element that includes a plurality of imaged regions 512 (e.g., print blocks 506) arranged in a highlight microdot print surface pattern, such as pattern 5D. Each highlight microdot print surface is for a single highlight microdot feature in the mask element 510, which corresponds with a single microdot structure in the corresponding flexographic printing plate that prints a highlight image. Each imaged region 512 can have at least one print block 506 (e.g., imaged block) and can be optically transmissive. Also, at least one opaque island 514 is formed by at least one blank block 508 (e.g., non-imaged block) being located within the highlight microdot print surface pattern. The arrangement of the plurality of imaged regions 512 (e.g., one or more print blocks 506) and the at least one opaque island 514 defines a highlight microdot print surface pattern 515. Additionally, there is an opaque void region 516 surrounding the microdot print surface pattern 515 that is formed by a plurality of blank blocks 508 (e.g., non-imaged blocks).

In the mask element 510, opaque regions formed by the blank blocks 508 are not imaged, whereas the imaged regions are the print blocks 506 that are for optically transmissive regions. The blocks 504 are arranged in a grid 502 pattern, with the sides of each block 504 being in the grid 502. The blocks 504 have a height in one direction (e.g., vertical direction) and a width in the orthogonal direction (e.g., horizontal direction), with the long dimension being the vertical direction defining the height. The blocks 504 can be rectangular as shown for ¼ pixel blocks or square when the sides are even for ½ pixel blocks. While the print blocks 506 can form a recess, aperture (e.g., optical aperture), or optical pathway in the mask element 510 from the imaging process, the blank blocks 508 are non-imaged blocks in the mask element 510 that are opaque or not optically transmissive and not forming any optical pathway.

The example of pattern 5D shows the print blocks 506 arranged into a continuous ring shape for the imaged region 512 with the internal opaque island 514 therein. The other patterns in FIG. 5A also show continuous ring shapes. The ring shape provides an outer wall in the flexographic printing plate that defines an outer wall structure with an inner recess, void or hole to retain ink in the microdot structure. This patterned printing surface (515) of the microdot structure helps the ink spread to provide the highlight dot. The highlight dot structure with pattern 5D can be 5 pixels in height (e.g., about 53 microns) and 2.5 pixels in width (e.g., about 26.5 microns). The pattern 5D has 6 pixels for UV light transmission during formation of the flexographic printing plate highlight dot structure, which is equivalent to a 2×3 solid dot. Also, there are 2.5 pixels of recess in the formed flexographic printing plate for holding ink, which is about a 29.4% open area in the flexographic printing plate highlight dot structure. As such, the highlight microdot printhead can be configured as shown in pattern 5D. In the mask element 510, the print blocks 506 are imaged blocks in view of the imaging protocol to form the mask element, and thereby the blank blocks 508 are the non-imaged blocks. In some aspects, pattern 5C may be determined to be semi-continuous ring shape due to only corners of the print blocks 506 are touching; however, there is no gap between the members of the imaged region ring shape.

In some embodiments, each imaged block (e.g., print block 506) or non-imaged block (e.g., blank block 508) has a height of one pixel and a width of a ¼ pixel. Also, each pixel is about 10 microns to about 11 microns in height and width. The width of each imaged region is at least a ¼ pixel. The height of each imaged region is at least 1 pixel.

As shown in the figures, the width of the highlight microdot print surface pattern 515, such as the imaged region thereof 512, can range from 2 pixels to 8 pixels, from 2.25 pixels to 6 pixels, from 2.5 pixels to 5 pixels, or any range therebetween as possible. A height of the highlight microdot print surface pattern 515 (e.g., imaged region 512) can range from 3 pixels to 8 pixels, such as 4 pixels, 5 pixels, 6 pixels, or 7 pixels. The width of each internal opaque island 514 can be at least a ¼ pixel, but can range as shown in the patterns so as to be within the highlight microdot print surface pattern 515. A height of each internal opaque island 514 is at least 1 pixel, but can range to be 2 less pixels than the height of the highlight microdot print surface pattern 515.

In an example range of embodiments, the highlight microdot print surface pattern 515 can include a width of at least one imaged region 512 that is at least a ½ pixel and can range to be up to ¾ pixel or 1 pixel for a side (e.g., patterns 5A, 5B, 5C, etc.) and up to 1.5 pixels for an end (e.g., patterns 5G, 5H, and 5I). The highlight microdot print surface pattern 515 can include a height of at least one imaged region 512 that is at least 2 pixels connected together at least through a corner, such as all of the patterns of FIG. 5A. The width of the highlight microdot print surface pattern 515 can range from 2.5 pixels to 4 pixels. The height of the highlight microdot print surface pattern 515 can range from 4 pixels to 6 pixels. A width of at least one internal opaque island 514 is at least ½ pixel, but can be larger while still fitting inside of the highlight microdot print surface pattern 515. The highlight microdot print surface pattern 515 can have a height of at least one internal opaque island that is at least 2 pixels with each non-imaged block touching another imaged block by at least a ¼ pixel. However, it should be recognized that other embodiments are possible.

Figure 5A:
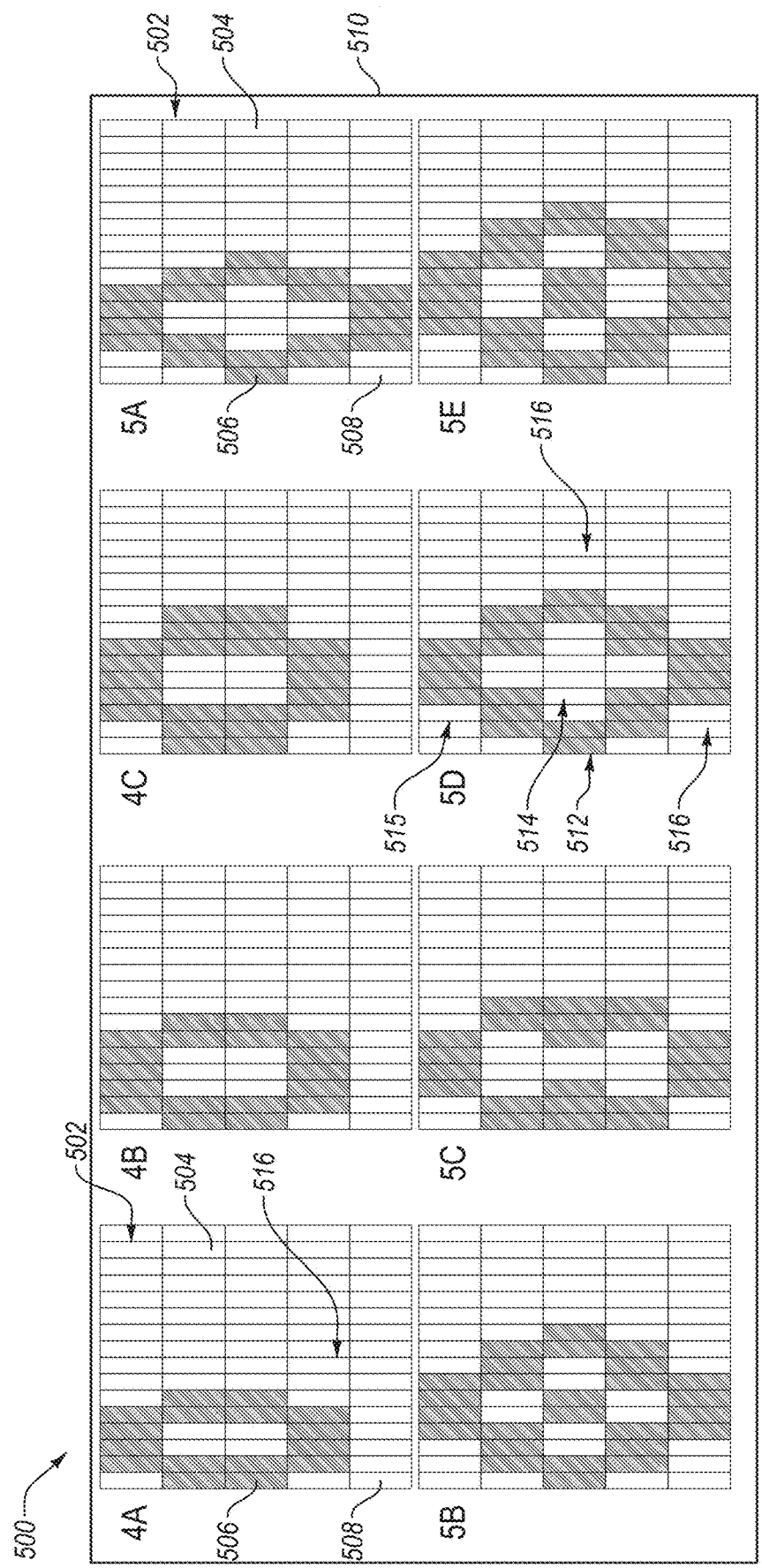
FIGS. 5A-5D include schematic representations of highlight microdot printhead patterns for masks and flexographic printing plates.
Figure 5B:
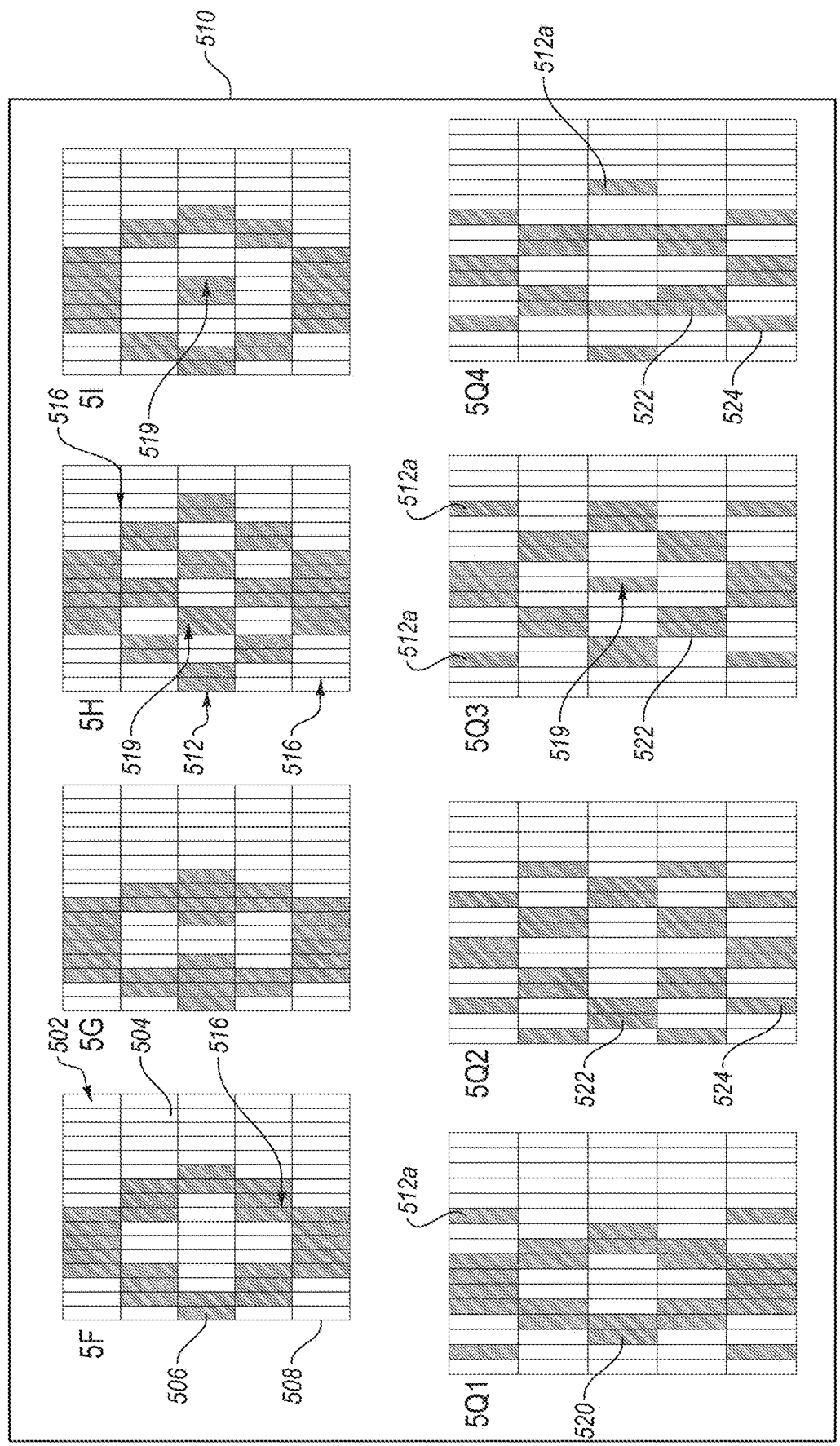

FIG. 5B shows patterns with outer boundary regions formed into continuous rings (5F, 5G), semi-continuous rings (5H, 5I), and discontinuous rings 5Q1, 5Q2, 5Q3, and Notably, the discontinuous rings include outer imaged regions 512a that are not touching each other such that there are gaps of one or more blank blocks 508 therebetween. Patterns 5Q1, 5Q2, 5Q3, and 5Q4 include the imaged region 512 forming an annular or ring-like structure with the opaque island 514. Also, patterns 5H, 5I, and show internal imaged blocks 519, which form imaged block islands. Patterns 5Q5, 5Q7, and 5Q8 of FIG. 5C illustrate the outer imaged regions that can be random, zig-zagged, or symmetrical that also can be used by having outer boundary imaged regions 512 with internal imaged regions and internal non-imaged regions.

Figure 5C:
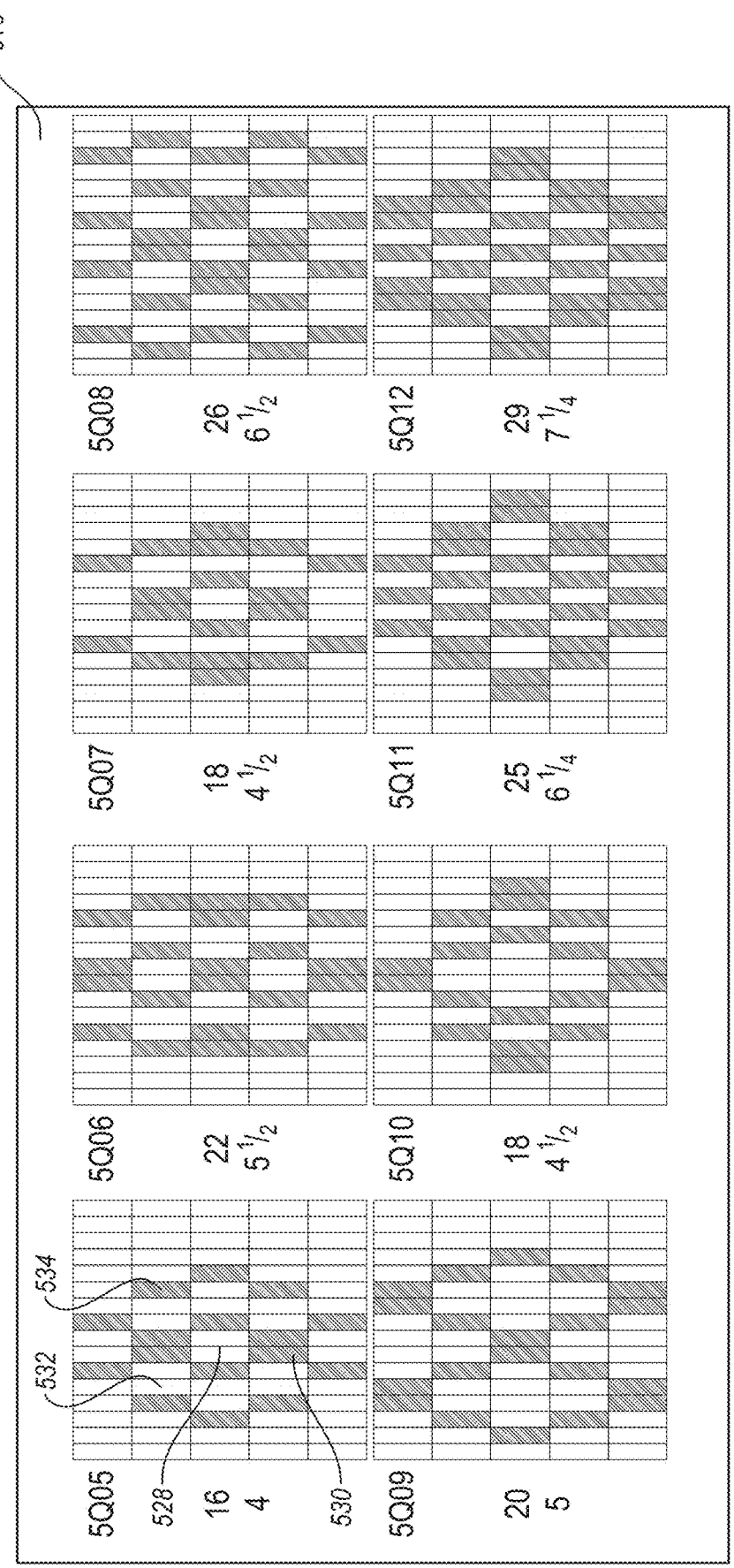
Figure 5D:
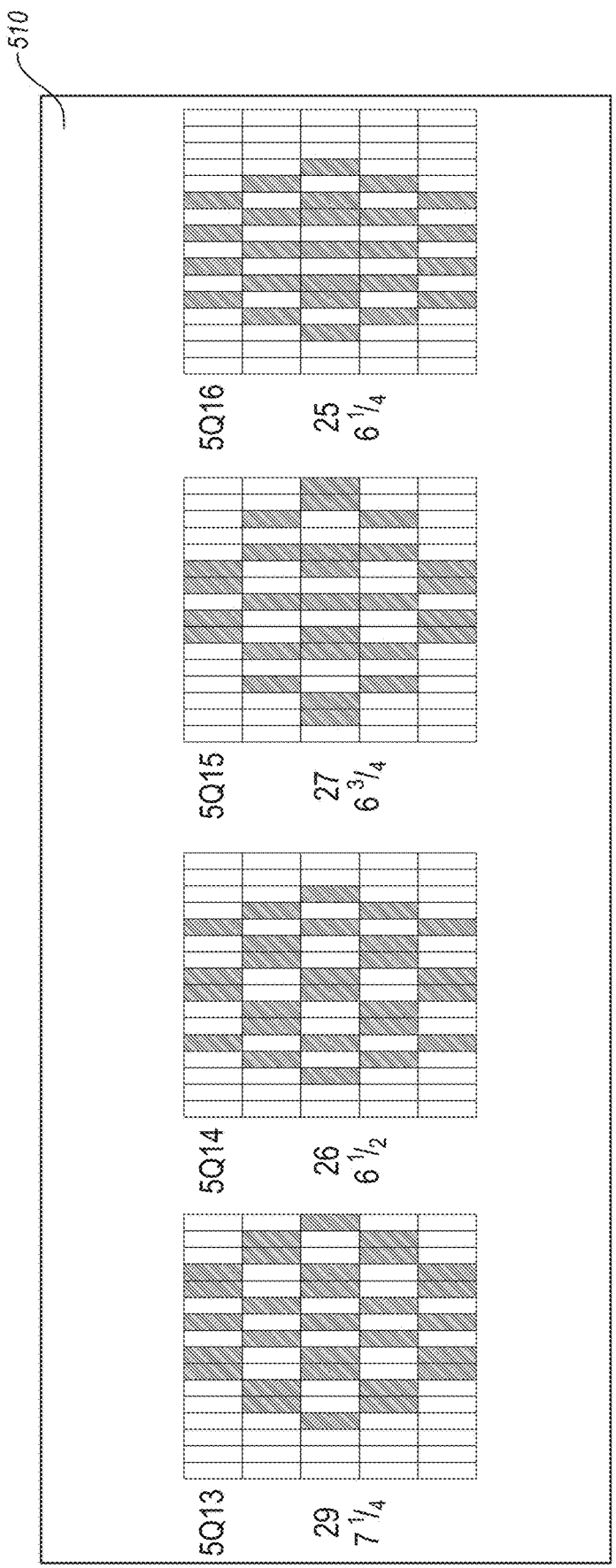

FIGS. 5C-5D shows patterns 5Q05, 5Q06, 5Q07, 5Q08, 5Q09, 5Q10, 5Q11, 5Q12, 5Q14, 5Q15, and 5Q16, which show additional examples of complex highlight microdot patterns with the ¼ pixel width imaged regions 512 (e.g., print blocks 506).

In some embodiments, a highlight microdot mask element can include a plurality of imaged regions 512 arranged in a highlight microdot print surface pattern. Each imaged region can have at least one imaged block (e.g., print block 506) and can be optically transmissive. The mask element 510 can include at least one opaque island 514 formed by at least one non-imaged block located within the highlight microdot print surface pattern 515. The arrangement of the plurality of imaged regions 512 and the at least one opaque island 514 defines a highlight microdot pattern (515). An opaque void region 516 surrounds the microdot pattern, which opaque void region 516 is formed by a plurality of non-imaged blocks (508). The blocks 504 are arranged in a grid pattern 502, with the sides of each block 504 being in the grid. The blocks 504 have a height in one direction and a width in the orthogonal direction. The blocks 504 can be rectangular or square when the sides are even. While the imaged blocks (506) can form a recess, aperture (e.g., optical aperture), or optical pathway from the imaging process, the non-imaged blocks (508) in the mask 510 are opaque or not optically transmissive and not forming any optical pathway.

In some embodiments, a highlight microdot mask element can include a plurality of imaged regions that form a plurality of outer boundary regions that together form an outer boundary pattern. Each outer boundary region can have at least one imaged block and can be optically transmissive, and form somewhat of a boundary around one or more non-imaged blocks. There is at least one internal opaque island within the outer boundary pattern that is formed by at least one non-imaged block located within the outer boundary pattern. Also, there is an opaque void region that surrounds the outer boundary pattern. In some aspects, each imaged block or non-imaged block has a height of one pixel and a width of ¼ pixel, each pixel is about 10 microns to about 11 microns in height and width.

In some embodiments, the highlight microdot mask element can include a plurality of outer boundary pixel regions that form a continuous annular boundary region with each imaged block touching another imaged block by at least a corner (e.g., see patterns 4A through 5I). In some embodiments, the plurality of outer boundary pixel regions can form a discontinuous annular boundary region with at least one gap non-imaged block between two adjacent imaged blocks of the plurality of outer boundary pixel regions (e.g., see patterns 5Q1, 5Q2, 5Q3, 5Q4, 5Q5, 5Q6, 5Q7, and 5Q8 as well as 5Q05-5Q16).

In some embodiments, the highlight microdot mask element can include a single internal opaque island within a continuous annular boundary region (e.g., patterns 4A-5A, 5C-5D, 5F, and 5G).

In some embodiments, a highlight microdot mask element can include a single internal opaque island within a discontinuous annular boundary region (e.g., patterns 5Q2, 5Q3, and 5Q4).

In some embodiments, a highlight microdot mask element can include a plurality of internal opaque islands within a continuous annular boundary region (e.g., patterns 5B, and 5H).

In some embodiments, a highlight microdot mask element can include a plurality of internal opaque islands within a discontinuous annular boundary region (e.g., patterns 5Q06, 5Q08, 5Q11, 5Q12, 5Q13, 5Q14, 5Q15, and 5Q16).

In some embodiments, the highlight microdot mask element can include a single internal imaged region within a continuous annular boundary region (e.g., patterns 5B, and 5I).

In some embodiments, a highlight microdot mask element can include a single internal imaged region within a discontinuous annular boundary region (e.g., pattern 5Q3).

In some embodiments, a highlight microdot mask element can include a plurality of internal imaged regions within a continuous annular boundary region (e.g., pattern 5H).

In some embodiments, a highlight microdot mask element can include a plurality of internal imaged regions within a discontinuous annular boundary region (e.g., patterns 5Q08-5Q16).

Pattern 5Q1 shows a main continuous ring 520 with the outer imaged regions 512a as outlier islands. Pattern 5Q1 has a semi-continuous main ring 522 and a discontinuous outer ring 524. Pattern 5Q3 includes a main continuous ring 520 with outer imaged regions 512a as outlier islands with an internal imaged block 519 as an internal imaged island. Pattern 5Q4 shows a semi-continuous main ring 522 and a discontinuous outer ring 524. Pattern 5Q05 shows a central opaque island 528 in a central semi-continuous imaged ring 530 with an outer discontinuous opaque ring 532 within an outer discontinuous imaged ring 534. Patterns 5Q06 onward continue to add variations to the placement of the print blocks 506 and the blank blocks 508 to form blank islands within various border print blocks 506. Together, the blank blocks 508 will become areas that retain ink in the printing plate, and the print blocks 506 are the print surfaces. The combination of the retaining walls of print surfaces and the ink reservoirs of blank blocks 508 allows for some ink retention and ink printing in a manner that reduces the halo effect or formation of the donut dot. The microdot printhead patterns including the one or more ink reservoir regions (e.g., blank regions) within one or more structural print surfaces (print regions) that provide walls to the ink reservoir regions.

For example, pattern 5Q2 shows a mix of half pixels with quarter pixels to give the print head more structure and print surface area. The configuration does not add more depth, which is beneficial for less ink carrying capacity.

For example, pattern 5Q1 is 30 microns tall and 10 microns wide.

For example, pattern 5Q05 includes a 16 print blocks, which is 16 quarter pixels. The number 4 represents the whole pixels count of how much light can get through the mask. Accordingly, patterns 5Q05 on show the number of print blocks over the number of whole pixels (e.g., number of print blocks divided by 4).

In some embodiments, the highlight microdot mask element can include at least total blocks, at least 24 blocks, at least 28 blocks, at least 30 blocks, at least 35 blocks, at least 40 blocks, at least 50 blocks, at least 55 blocks, at least 60 blocks, at least 65 blocks, or 70 blocks or greater.

In some embodiments, a highlight microdot mask element can include at least 16 imaged blocks in the pattern, at least 20 imaged blocks, at least 24 imaged blocks, or at least 26 imaged blocks.

TABLE 1

Pattern Information

| Pattern ID | Total Blocks | Print Blocks | Blank Blocks | % Blank Area |
|---|---|---|---|---|
| 4A | 20 | 16 | 4 | 20% |
| 4B | 24 | 18 | 6 | 25% |
| 4C | 28 | 22 | 6 | 21.4% |
| 5A | 28 | 20 | 8 | 28.5% |
| 5B | 32 | 26 | 8 | 25% |
| 5C | 32 | 22 | 10 | 31.2% |
| 5D | 34 | 24 | 10 | 29.4% |
| 5E | 39 | 29 | 10 | 25.6% |
| 5F | 37 | 24 | 13 | 35.1% |
| 5G | 38 | 28 | 10 | 26.3% |
| 5H | 46 | 32 | 14 | 30.4% |
| 5I | 44 | 26 | 18 | 40.9% |
| 5Q1 | 40 | 24 | 8/16* | 20/40%* |
| 5Q2 | 50 | 24 | 10/26* | 20/52%* |
| 5Q3 | 46 | 23 | 12/23* | 26/50%* |
| 5Q4 | 40 | 20 | 8/20* | 20/50%* |

NX Pixels = ¼ Pixel Segments: 2 × 2 = 16+, 2 × 3 = 24+, 3 × 3 = 36+, 3 × 4 = 48+
*Open Segments Enclosed Completely/Within Outer Solid Perimeter Segments.

In some aspects, the printhead pattern includes at least 29 print blocks forming at least one internal blank region within a ring region.

In some embodiments, a highlight microdot mask element can include at least 4 non-imaged blocks (blank blocks) that make up the at least one internal opaque island.

In some embodiments, a highlight microdot mask element can include at least 20% of total blocks are non-imaged blocks (blank blocks).

In some embodiments, the highlight microdot mask element can include the plurality of outer boundary regions of print blocks together forming an optically transmissive ring. There can be at least one internal opaque island formed by a plurality of non-imaged blocks located within the optically transmissive ring. The internal opaque island can have an island width of at least ½ pixel and an island height of at least 2 pixels. There can also be an opaque void region surrounding the optically transmissive ring, which is at 4 pixels from an adjacent highlight microdot structure, or 5, 6, 7, 8, 9, 10, 15, 20, 25, 50, 75, or 100 or more pixels from an adjacent microdot structure.

In some embodiments, a mask element can include the highlight microdot mask element of one of the embodiments, and an image pattern having a highlight mask region with the highlight microdot mask element. In some aspects, the mask can include a highlight microdot region of an imaged material with a thermally-ablatable imaging layer having the imaged blocks and non-imaged blocks that are arranged to form a highlight dot pattern on a single highlight microdot structure. In some aspects, the mask can include an optically transmissive ring formed by a plurality of imaged blocks with a thickness of the ring being at least a ¼ pixel and an orthogonal thickness of at least 1 pixel. The ring height can range from 3 pixels to 8 pixels, and the ring width can range from 1 pixel to 8 pixels. The highlight microdot pattern can include at least one internal opaque island formed by a plurality of non-imaged blocks located within the optically transmissive ring. The internal opaque island can have an island height of at least 1 pixel and an island width of at least 1 pixel. An opaque void region surrounds the optically transmissive ring.

In some embodiments, the mask can include an imaged material with a thermally-ablatable imaging layer having imaged blocks and non-imaged blocks that are arranged to form the image pattern. The image pattern includes at least one highlight mask region that has a plurality of highlight microdot structures that form a highlight pattern in the image pattern. The highlight mask region includes a plurality of opaque regions of the thermally-ablatable imaging layer. Each opaque region being one or more non-imaged blocks. The highlight mask region includes a plurality of optically-transmissive regions in the thermally-ablatable imaging layer. Each optically-transmissive region can be one or more imaged blocks, wherein each highlight dot region includes at least one highlight microdot mask element.

In some embodiments, the mask can include an optically transmissive ring formed by a plurality of imaged blocks with a thickness of the ring being at least a ¼ pixel, a ring height ranging from 4 pixels to 8 pixels, and a ring width ranging from 2 pixels to 8 pixels. An internal opaque island is formed by a plurality of non-imaged blocks located within the optically transmissive ring. The internal opaque island can have an island width of at least 1 pixel and an island height of at least 2 pixel. There is an opaque void region surrounding the optically transmissive ring formed by a plurality of non-imaged blocks.

In some embodiments, a method of forming a mask for highlight-producing flexographic printing plates can be provided. The mask can be formed from an imageable material having a thermally-ablatable imaging layer. An image pattern is provided that has at least one highlight region. The highlight region includes a plurality of highlight microdot mask elements. Each highlight microdot mask element includes a microdot pattern formed by an arrangement of a plurality of imaged regions and at least one opaque island. Then, a laser is used for imaging the imageable material to form a mask image in the thermally-ablatable imaging layer. In some aspects, the mask image includes the image pattern having the at least one highlight region. In some aspects, the highlight region includes the plurality of highlight microdot mask elements. In some aspects, each highlight microdot mask element includes the microdot pattern formed by a plurality of imaged blocks in the thermally-ablatable imaging layer and the at least one opaque island of the thermally-ablatable imaging layer is formed by at least one non-imaged block. The imaged blocks and non-imaged blocks are arranged together to form the microdot pattern in the mask image, wherein an opaque void region formed by a plurality of non-imaged blocks surrounds the microdot pattern.

The mask is then used to prepare a flexographic printing plate that has a relief image formed of elevations above a floor, where some of the elevations are from highlight microdot structures with highlight printhead patterns.

Printing Plate

Figure 3:
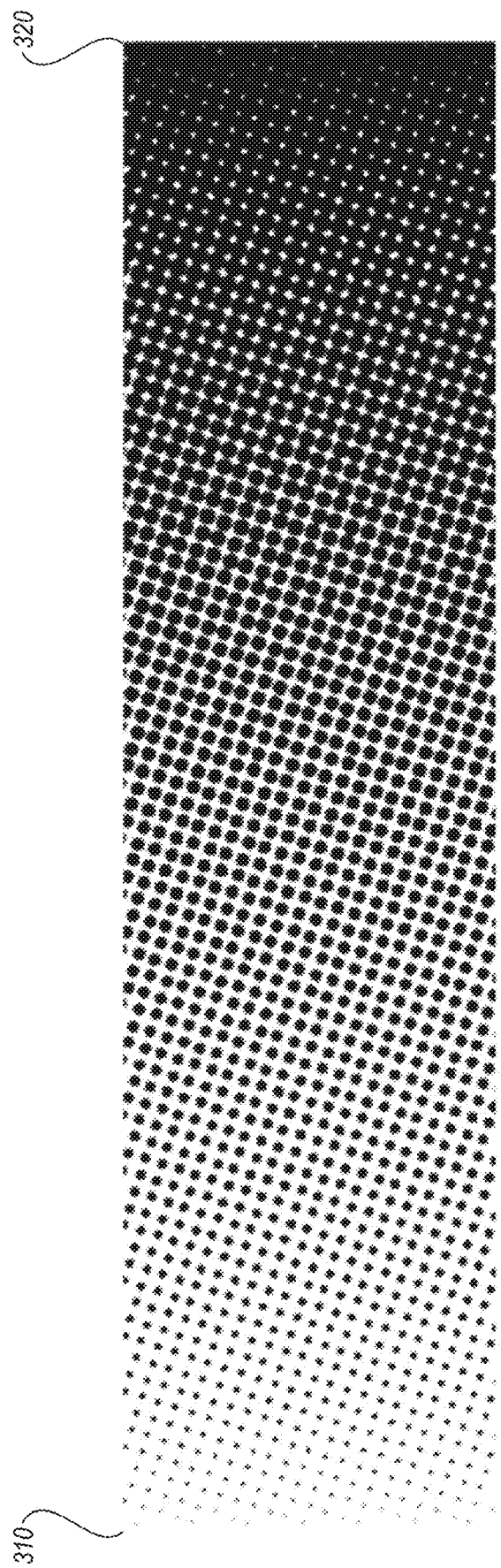
FIG. 3 is a representation of flexographic printing of a highlight image with visible dots.

The printing plates can include highlight microdot structures configured to print in a highlight region of an image. The highlight dot structures can include a printhead with a printing surface that is larger than the smallest microdots used in flexographic printing (e.g., alignment microdots or U.S. Pat. No. 8,896,894). However, the scale of the highlight dot structures are each in a micron scale (e.g., 30-70 or 40-60 or about 50-55 microns), and are thereby highlight microdot structures. However, the highlight microdot structures include a print surface pattern, with print surfaces and recesses that cooperate to allow for the highlight dots that are printed with ink to be larger than the smallest flexographic printing microdots. However, the print surface pattern of the highlight microdot structure provides a visual illusion to the human eye, which allows the visibility of the highlighting to virtually fade to zero visibility if desired. This allows for gradients of visibility of the resulting highlight image (e.g., see FIG. 3).

Each highlight microdot structure can include a pattern of print surfaces with recesses therebetween, which are arranged to form a highlight microdot print surface pattern. The highlight microdot print surface pattern can include blocks, which are protruding blocks with print surfaces or recess blocks that can carry ink. The highlight microdot pattern includes the recesses that retain ink and the print surfaces that print the ink. However, the configuration allows for printing that appears to the human eye as a highlight printing, which previously has been unavailable for flexographic printing. The printing highlight dot can have a lower contrast by spreading the ink thinner over a larger area compared to the smallest available microdots, making it less visible to the human eye than a smaller normal high contrast flexographically printed dot.

Figure 6A:
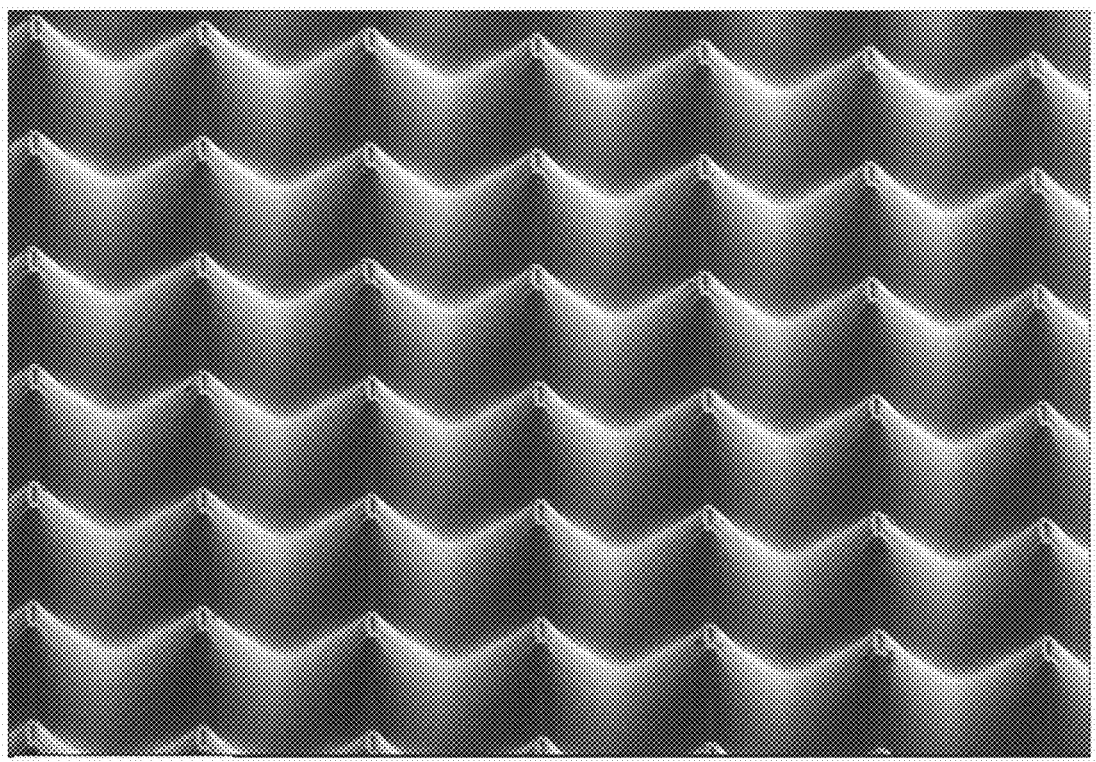
FIG. 6A is a SEM image of an array of microdot printheads showing print surface pattern 4A with scale bar of 250 microns (250× magnification).
Figure 6B:
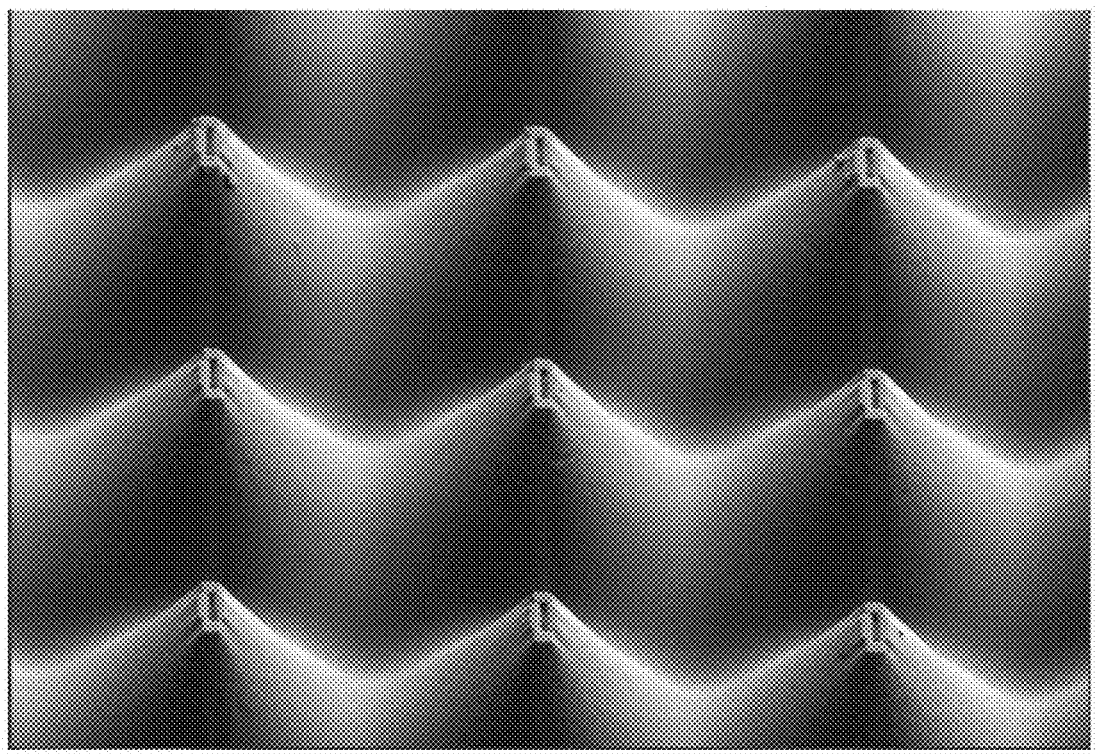
FIG. 6B is a SEM image of the array of highlight microdot printheads of FIG. 6A, with scale bar of 100 microns (500× magnification).
Figure 6C:
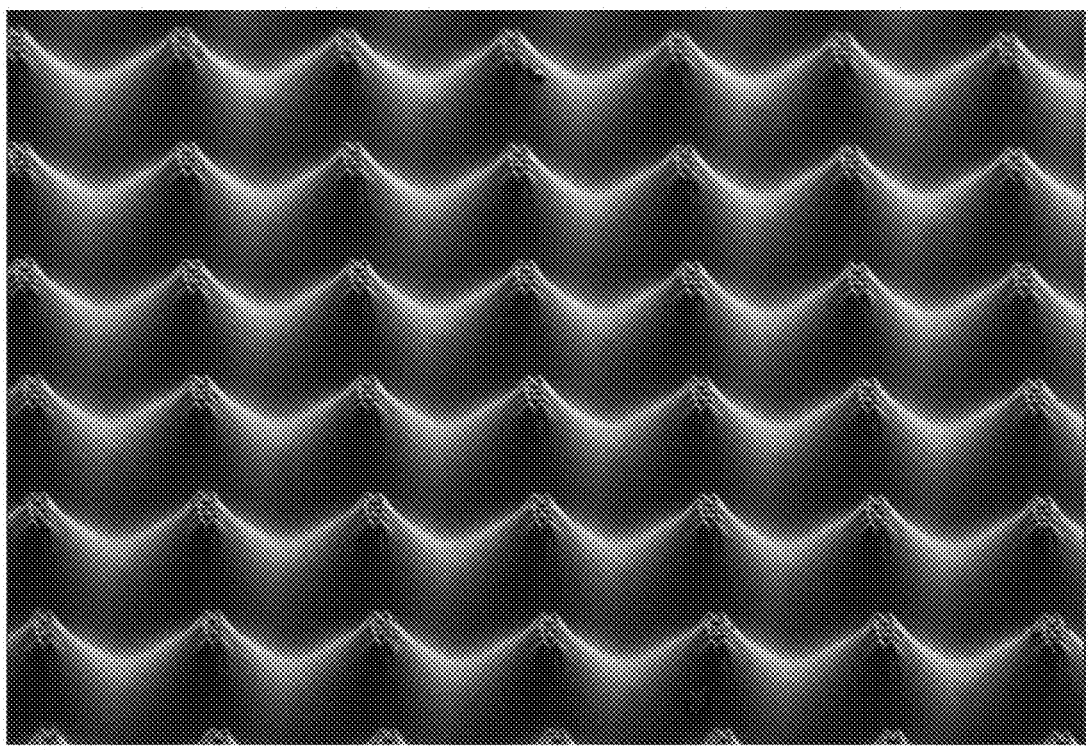
FIG. 6C is a SEM image of an array of microdot printheads showing print surface pattern 5Q5 with scale bar of 250 microns (250× magnification).
Figure 6D:
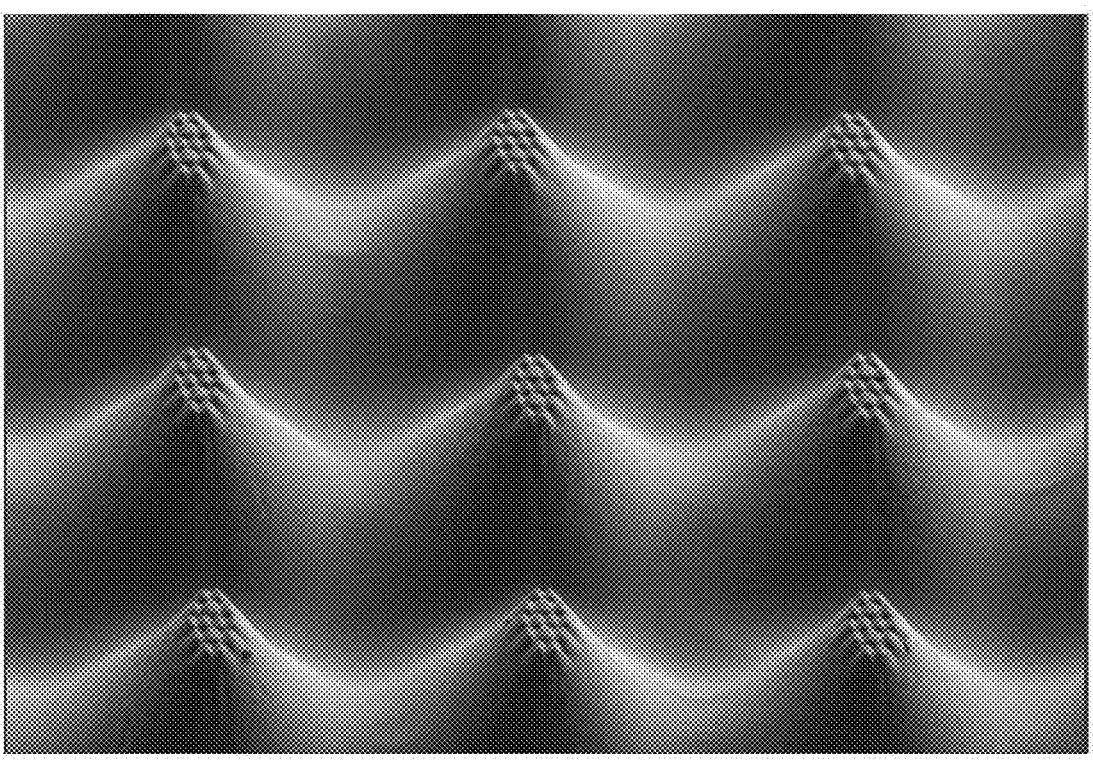
FIG. 6D is a SEM image of the array of highlight microdot printheads of FIG. 6C, with scale bar of 100 microns (50× magnification).
Figure 6E:
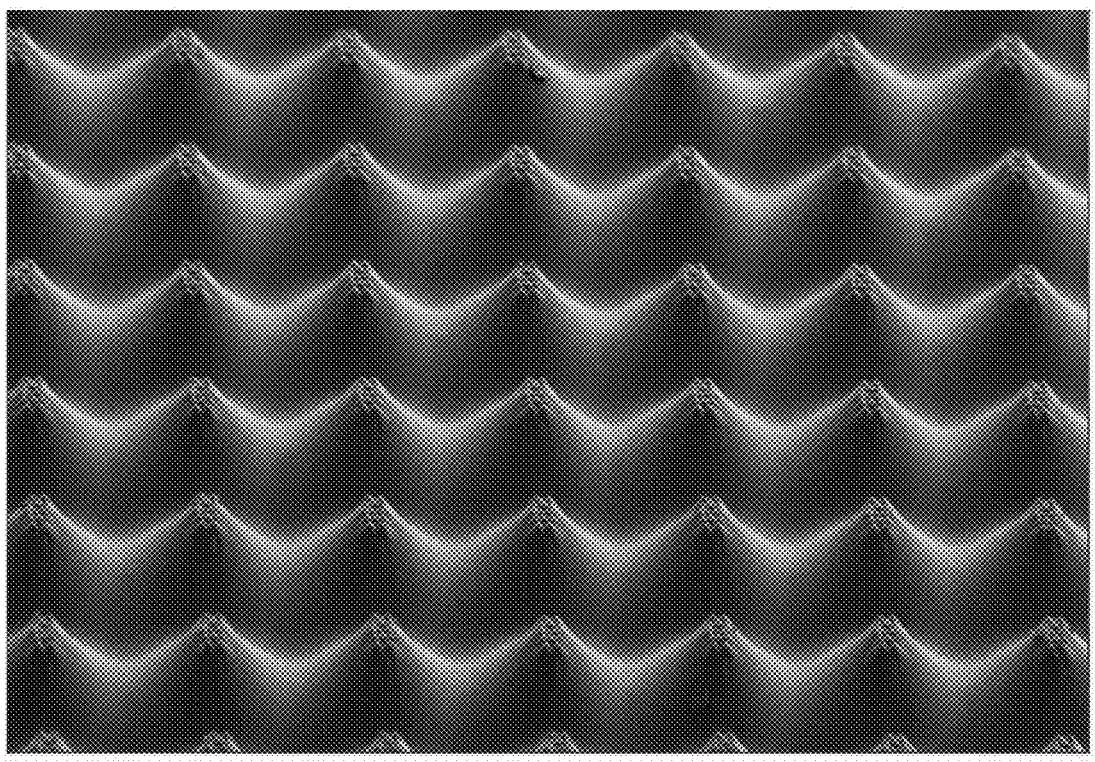
FIG. 6E is a SEM image of an array of microdot printheads showing print surface pattern 5Q7 with scale bar of 250 microns (250× magnification).
Figure 6F:
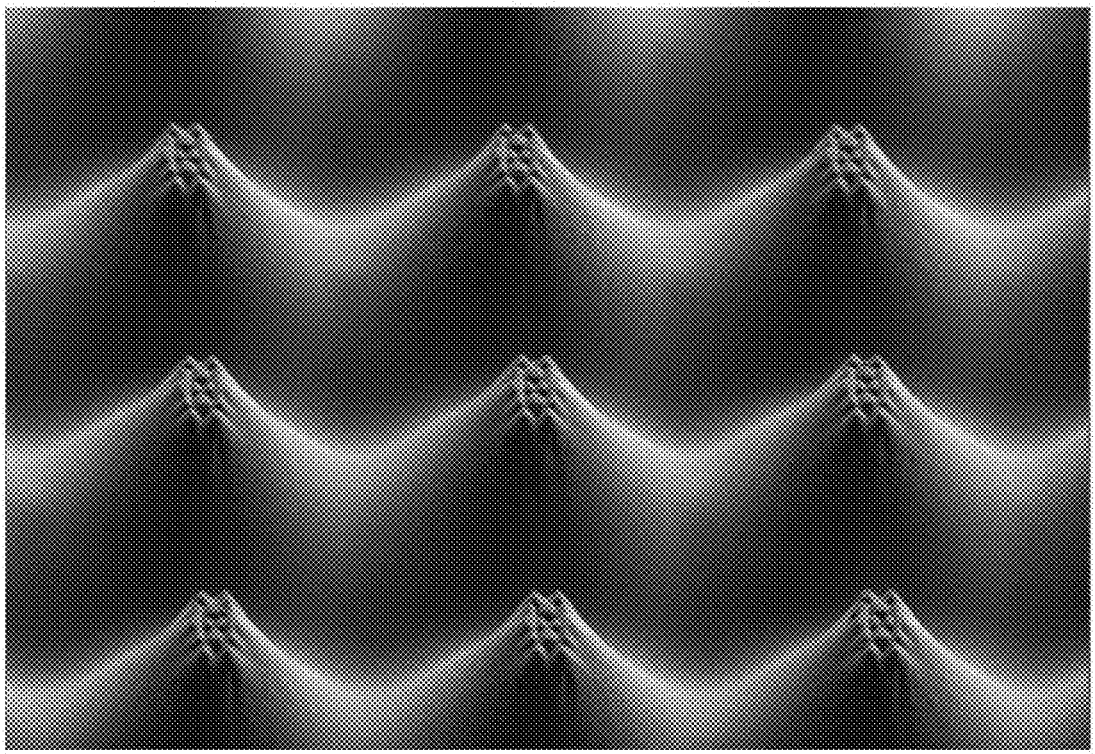
FIG. 6F is a SEM image of the array of highlight microdot printheads of FIG. 6E, with scale bar of 100 microns (500× magnification).

FIGS. 6A-6F illustrate three embodiments of an array of highlight microdot structures in a highlight region of a printing plate. These highlight microdot structures are less than about 50 microns in cross-dimension (e.g., width, length, or diameter), as shown in the size bar. The highlight microdot structures are shown without any features, such as elevations or recesses. As such, the highlight microdot structures do not include a boundary formed by the elevated regions with a recess within the boundary formed by a recess without the elevated boundary. FIG. 6A is a SEM image of an array of microdot printheads showing print surface pattern 4A (FIG. 5A) with scale bar of 250 microns (250× magnification). FIG. 6B is a SEM image of the array of highlight microdot printheads of FIG. 6A, with scale bar of 100 microns (500× magnification). FIG. 6C is a SEM image of an array of microdot printheads showing print surface pattern 5Q05 (FIG. 5C) with scale bar of 250 microns (250× magnification). FIG. 6D is a SEM image of the array of highlight microdot printheads of FIG. 6C, with scale bar of 100 microns (500× magnification). FIG. 6E is a SEM image of an array of microdot printheads showing print surface pattern 5Q07 (FIG. 5C) with scale bar of 250 microns (250× magnification). FIG. 6F is a SEM image of the array of highlight microdot printheads of FIG. 6D, with scale bar of 100 microns (500× magnification).

FIGS. 6A-6F show flexographic plate highlight microdot printheads comprising a plurality of elevated regions forming a boundary structure with an internal recess surrounded by a void. The plurality of elevated regions are arranged in a highlight microdot print surface pattern. Each elevated region has at least one elevated block forming a print surface. The microdot print surface pattern can include at least one internal recess formed by at least one recessed block located within the highlight microdot print surface pattern. The arrangement of the plurality of elevated regions and the recess define a highlight microdot print surface pattern of a highlight microdot. Each highlight microdot can have the print surface pattern with the print surface boundary and internal recess. Each highlight microdot can be surrounded by a recess void region which has a recess or depth significantly deeper or of greater depth dimension compared to the recess void region on the highlight microdot printhead. The deep void region surrounds each highlight microdot of the highlight microdot pattern formed by a plurality of recess blocks. The number of adjacent recess blocks is significantly high to form the deep recess void region between each highlight microdot structure. Each recess block has a recess surface lower than each print surface. The recess around the highlight microdot structure is significantly deeper than the void recess on the highlight microdot printhead.

The highlight microdot printhead can correspond with the mask that is used for formation of the printing plate. The mask is designed as a grid of blocks, and thereby the highlight microdot printhead also includes a grid of blocks, with some blocks being protrusions (e.g., hardened) and some blocks being recesses (e.g., non-hardened and removed) that form the internal recess within the protrusion boundary. Accordingly, the raised blocks form the boundary that retains the recess of recessed blocks. As shown in FIGS. 6A-6F and FIGS. 5A-5D, the blocks are arranged in a grid pattern, with the sides of each block being in the grid. The blocks have a height in one direction and a width in the orthogonal direction. The blocks can be elevated blocks and have a print surface or the blocks can be recess blocks without a print surface. The blocks can be rectangular or square when the sides are even. While some of the blocks can be in the form of a recess, the printing blocks have a print surface above the recesses.

Figure 7A:
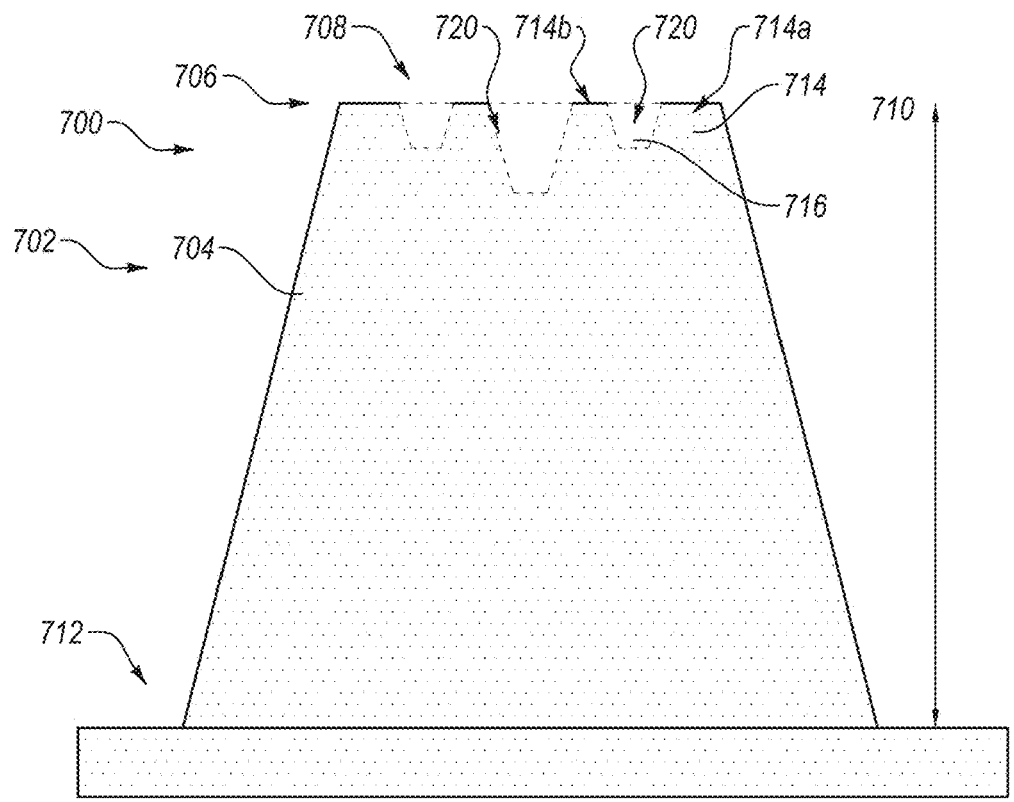
FIG. 7A is a cross-sectional schematic illustration of an embodiment of a highlight microdot structure with a print surface pattern.
Figure 7B:
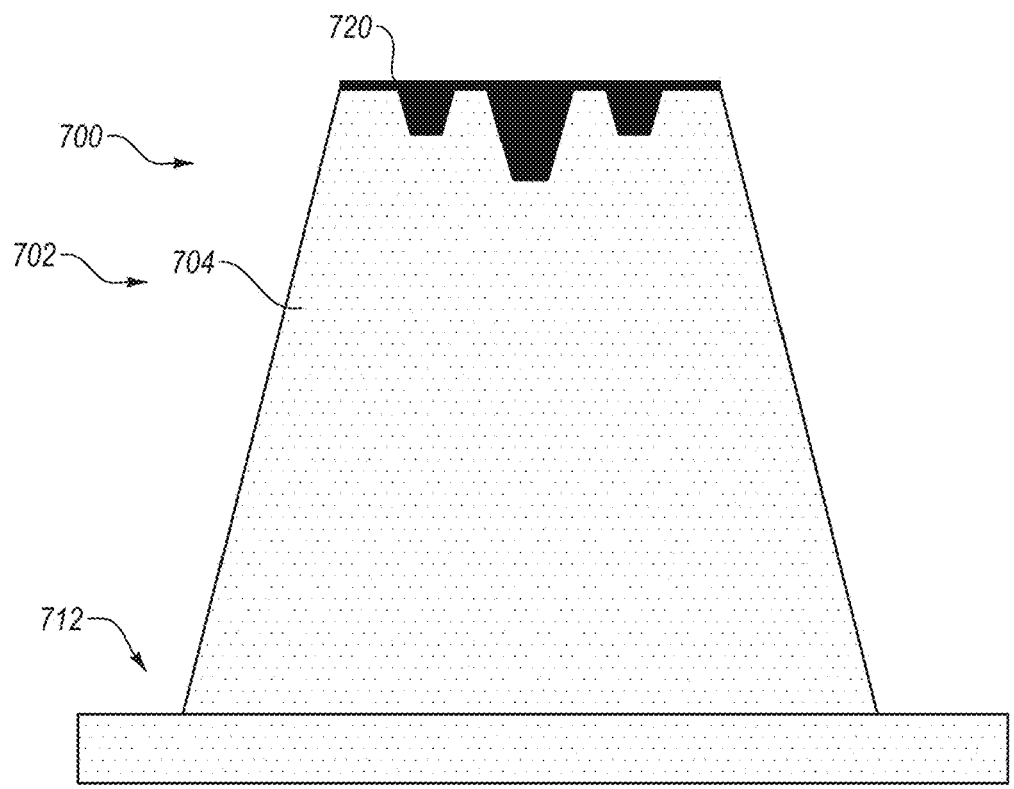
FIG. 7B is a cross-sectional schematic illustration of an embodiment of a highlight microdot structure having ink in the print surface pattern.

FIG. 7A shows an embodiment of a flexographic printing plate 700 with a highlight image region 702 can include at least one highlight microdot structure 704 with a highlight microdot printhead 706, which has the print surface pattern 708. The highlight microdot printhead 706 is an elevated region 710 compared to the void region 712 that is a recess around the highlight microdot structure. The highlight microdot printhead 706 is patterned to have elevated regions 714 and recess regions 716 that form the highlight microdot pattern, which is the same as the print surface pattern 708. The elevated regions 714 forming barriers around the recess regions 716 within the highlight microdot printhead 706. The outer elevated regions 714a are two blocks wide (e.g., ½ pixel). The shallow recesses 718 inward from the outer elevated regions 714a are a single block wide (e.g., ¼ pixel). The internal elevated regions 714b are one block wide (e.g., ¼ pixel. The deep central recess 720 is two blocks wide (e.g., ½ pixel), and thereby deeper than the shallow recess 718. Different patterns can have different shallow recesses and deeper recesses depending on the recess blocks and the print blocks. It should be recognized that wider recesses could also make even deeper recesses. As such, the highlight microdot printhead 706 can include a series of elevated regions 714 (e.g., islands or barriers) and lower recess areas 716 that contain the ink 720 (e.g., pooled) within the highlight microdot pattern 708 as shown in FIG. 7B. This combination of higher islands and lower recesses in the highlight microdot pattern controls the ink release in a unique way to facilitate the visual image of the highlight region.

The highlight microdot printhead can include an area that can range from square to rectangular or circular to elliptical. The dimension of the highlight microdot printhead can be at least 30 microns in the longest dimension, such as the diameter or height, and more preferably greater than 30 microns in the shortest dimension. The dimension of the highlight microdot printhead can be at least 35 microns in the longest dimension, such as the diameter or height, and more preferably greater than 35 microns in the shortest dimension. The flexographic printing plate can have the highlight microdots printheads with a longest dimension (e.g., height or width) being less than 100 microns, less than 90 microns, less than 80 microns, less than 70 microns, less than 60 microns, less than 50 microns, or less than 40 microns, and greater than 35 microns, and with a shortest dimension being greater than 35 microns. The sizes can range between any of the smaller values and any of the higher values as endpoints to the range. In a particular example, the flexographic printing plate can have the highlight microdots printheads with a longest dimension being less than 70 microns. For example, the density of the highlight microdot structures can be measured using normal densitometry relating to the volume of ink transferred. The density can be a similar in value to normal flexographic microdots or dots, but the printed effect of the highlight microdots is visually less obvious and noticeable to the human eye at a normal observation distance.

In some embodiments, the blocks can have a height of 1 pixel and a width (e.g., in the orthogonal direction) of ¼ pixel. Some blocks can have a height of 1 pixel and a width of ½ pixel, ¾ pixel, 1 pixel or larger. The elevated blocks can be hardened material that is formed with the SQUARE-spot laser, which can be used to spread the microdot printhead over a larger area. The elevated blocks form islands and the recessed blocks for recesses or voids. The combination of elevated blocks and recess blocks defines the highlight microdot pattern. In some aspects, the elevated blocks form wall structures or barrier structures with the recess blocks forming voids therebetween. The configuration of elevated blocks and recessed blocks in the highlight microdot pattern can enable the highlight microdot structure to form correctly on the plate through UV light transfer through the mask that defines the image. The configurations allows a printed highlight microdot to have the ink spread the dot perimeter further out, with the ink film being thinner, in order to make the printed highlight microdont less visible to the human eye at normal viewing distance.

A highlight printing region of a flexographic printing plate can have a large number of the individual highlight microdot structures. For example, a highlight region, such as in a middle of an image or near an edge of an image, can include thousands of the individual highlight microdot structures. The highlights can be in single colors or multiple colors. The present highlight microdot structures can replace the smallest dots that have been previously used. Now, the highlight can be prepared with the structured low contrast highlights at the outer edges of images at the lowest percentages of the tonal range. As such, the highlight microdots can provide structured low contrast highlights that can replace the normal highlight dots, which are highly visible, as part of the normal tone or process printing. The highlight microdot printhead is configured to spread the same volume or less volume of ink over a larger area to be lower in contrast and less visible at the normal viewing distance. Thus, the low contrast highlights can be less visible and obvious to end consumers in stores under normal viewing conditions compared to prior highlight dots of flexographic printed images, and much more comparable to viewing gravure printed highlights. The highlight microdot structures shown herein with the print surface pattern can print highlight microdots without a donut or ring appearance. The printed highlight microdots can look like faded dots that may have a visibility gradient that decreases in visibility from the center outward.

Mask and Mask Precursor

A mask for use with the relief-forming precursor (e.g., the precursor to the flexographic printing plate) with a photo-sensitive layer can be prepared from a mask precursor. The mask can be prepared to have the negative image of the relief image of the flexographic printing plate, and can include a highlight region with the highlight microdot structures, each having the patterned highlight microdot printhead. Accordingly, a digital image of the mask is created to include the image features for flexographic printing, including the highlight region. The mask precursor can be prepared and processed with light (e.g., infrared, IR) to form a mask having the highlight region with highlight microdot printhead patterns. The mask can then be combined with the relief-forming precursor (e.g., by lamination) and processed, and then the mask and relief-forming precursor that is processed with light are separated from each other to result in the relief-containing flexographic printing plate with the highlight microdot structures having the microdot printhead pattern. During the separation process, it is important for the imaged relief-forming layer having the relief formed therein with the highlight microdot printheads is not damaged.

The mask precursor can be considered an imageable material due to having an imageable layer that forms the mask with the highlight region. The mask precursor can include three essential layers or films as described below, in order: a (a) transparent polymeric carrier sheet; a (b) a light to heat converting (LTHC) layer; and a (c) non-silver halide thermally-ablatable imaging layer (IL). Here, the LTHC layer is non-ablatable by thermal imaging with light, such as IR light. The non-silver halide thermally-ablatable imaging layer is ablatable by thermal imaging with light, such as IR light, but this thermally-ablatable imaging layer does not include a silver halide, and thereby is "a non-silver halide" imaging layer that is thermally ablatable. Accordingly, the LTHC layer includes substances that are not ablatable by thermal energy during imaging the IL layer with IR light. On the other hand, the IL layer includes substances that are thermally ablatable. Only these three layers or films are essential for forming a mask element (e.g., referred to as a mask) having a mask image in the IL layer. However, as noted below, in some embodiments, a (d) transparent polymeric overcoat layer can be disposed directly on the IL, but this optional feature is not required for forming a mask or using a mask image. Rather, it can be helpful in some uses for providing abrasion resistance.

Figure 8A:
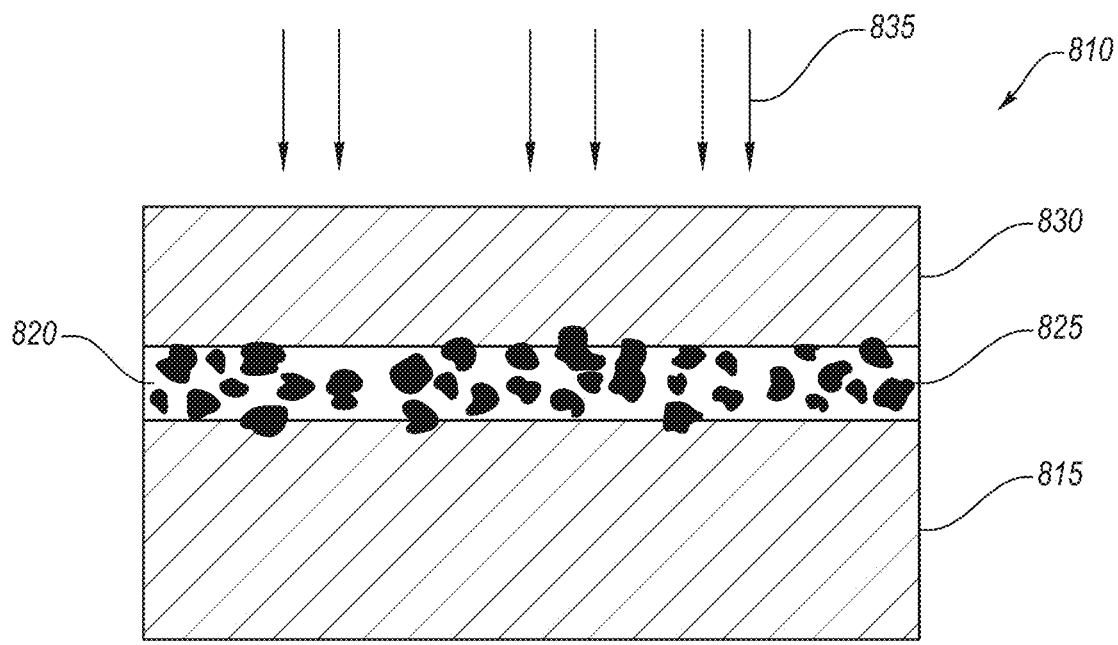
FIG. 8A is a cross-sectional schematic illustration of an embodiment of a mask precursor according to the present invention, and showing incident infrared radiation useful for making a mask element.

The mask precursor that is used to form a mask element that is used eventually to form a relief image in the flexographic printing plate can be prepared and then processed into the mask as described herein. In some embodiments, the mask precursor 810 is illustrated in FIG. 8A, which has (a) transparent polymeric carrier sheet 815, on which is directly disposed (b) LTHC layer 820 containing a non-ablatable binder material having the non-ablatable particles 825 that are described in more detail below, and (c) an ablatable IL 830 that is disposed directly on LTHC layer 820 and positioned to receive the light 835 (IR light) shown by the arrows.

Transparent Polymeric Carrier Sheet

The transparent polymeric carrier sheet can be any suitable transparent substrate or film. Useful transparent polymeric carrier sheets can be but are not limited to, transparent polymeric films and sheets composed of one or more polymers, such as polyesters including poly(ethylene terephthalate), poly(ethylene naphthalate), and fluorine polyester polymers; polyethylene-polypropylene copolymers; polybutadienes; polycarbonates; polyacrylates (polymers formed at least in part from one or more (meth)acrylate ethylenically unsaturated monomers); vinyl chloride polymers such as polyvinyl chloride and copolymers derived at least in part from vinyl chloride; hydrolyzed or non-hydrolyzed cellulose acetates; and other materials that would be readily apparent to one skilled in the art. The transparent polymeric carrier sheets can be composed of two or more polymeric materials as a blend or composite as long as the requisite transparency and protective properties are achieved. They can be formed as a single polymeric film or laminate of multiple polymeric films. Generally, the transparent polymeric carrier sheet has an average dry thickness of at least 25 μm and up to and including 250 μm, or typically of at least 75 μm and up to and including 175 μm.

For example, a transparent poly(ethylene terephthalate) sheet that is available from various commercial sources is suitable as a transparent polymeric carrier sheet.

If necessary, the transparent polymeric carrier sheet surface can be treated to modify its wettability and adhesion to applied coatings (such as an LTHC layer coating). Such surface treatments include but are not limited to corona discharge treatment and the application of subbing layers as long as the desired transparency (described above) is achieved.

If desired, the transparent polymeric carrier sheet can also comprise one or more "first" ultraviolet radiation absorbing compounds (as described below for the LTHC layer or IL). The one or more compounds of this type can be the same or different as the ultraviolet radiation absorbing compounds in the IL (see below). Each useful ultraviolet radiation absorbing compound generally absorbs electromagnetic radiation of at least 150 nm and up to and including 450 nm. These compounds can be present in the transparent polymeric carrier sheet in an amount of at least 0.01 weight % and up to and including 0.1 weight %, based on the total dry weight of the transparent polymeric carrier sheet.

In addition, the transparent polymeric carrier sheet can contain one or more "adhesion promoters" that improve adhesion between it and the adjacent LTHC layer. Useful adhesion promoters include but are not limited to, gelatin, poly(vinylidene chloride), poly (acrylonitrile-co-vinylidene chloride-co-acrylic acid), and polyethyleneimine.

Non-ablatable Light-to-Heat Converting (LTHC) Layer

The mask precursor also includes the non-ablatable LTHC layer disposed on the transparent polymeric carrier sheet and directly between the transparent polymeric carrier sheet and the IL. Suitable LTHC layer compositions have three essential components: a (i) first infrared radiation absorbing material; a (ii) a non-ablatable crosslinked binder material that is a thermally crosslinked organic polymer that is not ablatable by light radiation, such as IR radiation, visible radiation, or UV radiation; and (iii) non-ablatable particles that are not ablatable by light radiation, such as IR radiation, visible radiation, or UV radiation. The LTHC layer is generally disposed as a relatively uniform coating on the transparent polymeric carrier sheet (that is, being substantially continuous and having fairly uniform wet thickness) and then dried if any solvent is present in the composition formulation.

The LTHC layer is generally transparent as that term is defined above. In particular, the LTHC layer is transparent to UV radiation used to image the relief-forming precursor, as defined below.

One or more infrared absorbing materials that are collectively identified herein as the "first" infrared radiation absorbing material to distinguish it, if necessary, from the second infrared radiation absorbing material(s) in the IL (described below). The first infrared radiation absorbing material may also be in the transparent polymeric carrier sheet. The first and second infrared radiation absorbing materials can be one or more dyes or pigments, or mixtures thereof that will provide desired spectral absorption properties and are independently sensitive to electromagnetic radiation in the infrared electromagnetic wavelength range of at least 700 nm and up to and including 1,500 nm and typically of at least 750 nm and up to and including 1,200 nm. Such materials can be particulate in nature and are dispersed within the (ii) non-ablatable crosslinked binder material(s) described below. For example, they can be black dyes or pigments such as carbon black, metal oxides, and other materials described for example in U.S. Patent Application Publication 2005/0227182 ('182).

One suitable IR-absorbing pigment is a carbon black of which there are numerous types with various particles sizes that are commercially available. Examples include RAVEN 450, 760 ULTRA, 890, 1020, 1250 and others that are available from Columbian Chemicals Co. (Atlanta, Ga) as well as BLACK PEARLS 170, BLACK PEARLS 480, VULCAN XC72, BLACK PEARLS 1100 and others available from Cabot Corporation. Other useful carbon blacks are surface-functionalized with solubilizing groups. Carbon blacks that are grafted to hydrophilic, nonionic polymers, such as FX-GE-003 (manufactured by Nippon Shokubai), or which are surface-functionalized with anionic groups, such as CAB-O-JET® 200 or CAB-O-JET® 300 (manufactured by the Cabot Corporation) are also useful.

Useful first infrared radiation absorbing materials also include IR dyes including but not limited to, cationic infrared-absorbing dyes and photothermal-bleachable dyes. Examples of suitable IR dyes include but are not limited to, azo dyes, squarilium dyes, croconate dyes, triarylamine dyes, thiazolium dyes, indolium dyes, oxonol dyes, oxazolium dyes, cyanine dyes, merocyanine dyes, phthalocyanine dyes, indocyanine dyes, indotricarbocyanine dyes, oxatricarbocyanine dyes, thiocyanine dyes, thiatricarbocyanine dyes, merocyanine dyes, cryptocyanine dyes, naphthalocyanine dyes, polyaniline dyes, polypyrrole dyes, polythiophene dyes, chalcogenopyryloarylidene and bi(chalcogenopyrylo) polymethine dyes, oxyindolizine dyes, pyrylium dyes, pyrazoline azo dyes, oxazine dyes, naphthoquinone dyes, anthraquinone dyes, quinoneimine dyes, methine dyes, arylmethine dyes, squarine dyes, oxazole dyes, croconine dyes, porphyrin dyes, and any substituted or ionic form of the preceding dye classes. Suitable dyes are also described in U.S. Pat. No. 5,208,135 (Patel et al.), U.S. Pat. No. 6,569,603 (Furukawa), and U.S. Pat. No. 6,787,281 (Tao et al.), and EP Publication 1,182,033 (Fijimaki et al.). A general description of one class of suitable cyanine dyes is shown by the formula in paragraph of WO 2004/101280.

Near infrared absorbing cyanine dyes are also useful and are described for example in U.S. Pat. No. 6,309,792 (Hauck et al.), U.S. Pat. No. 6,264,920 (Achilefu et al.), U.S. Pat. No. 6,153,356 (Urano et al.), U.S. Pat. No. 5,496,903 (Watanate et al.), the disclosures of all of which are incorporated herein by reference. Suitable dyes may be formed using conventional methods and starting materials or obtained from various commercial sources including American Dye Source (Baie D'Urfe, Quebec, Canada) and FEW Chemicals (Germany).

The first infrared radiation absorbing material(s) is generally present in an amount sufficient to provide a transmission optical density of at least 0.025 and typically of at least 0.05 at the exposing electromagnetic radiation wavelength (e.g., IR). Generally, this is achieved by including at least 0.1 weight % and up to and including 5 weight %, or typically at least 0.3 weight % and up to and including 3 weight %, based on the total dry weight of the LTHC layer.

The first infrared radiation absorbing material in the LTHC layer can be the same or different chemical material (s) as the second infrared radiation absorbing compound that is incorporated into the IL as described below. The infrared radiation absorbing material in the LTHC layer may also be different from the infrared radiation absorbing material in the transparent polymeric carrier. In most embodiments, the first and second infrared radiation absorbing materials are the same chemical materials. The amounts of the first and second infrared radiation absorbing materials in the imageable material can be the same or different. In most embodiments, they are present in different amounts in the imageable material.

As noted, the LTHC layer comprises a non-ablatable crosslinked binder formed from one or more thermally crosslinked organic polymeric binders derived from thermally crosslinkable organic polymeric binders that have been crosslinked. The term "thermally crosslinkable" means that crosslinking groups are present and include for example, hydroxy-containing polymers. Particularly useful thermally crosslinkable organic polymers include but are not limited to, crosslinkable nitrocellulose; crosslinkable polyesters such as polyesters containing hydroxy groups; polyvinyl alcohol's; polyvinyl acetals such as polyvinyl butyral; or a combination of two or more of such crosslinkable organic polymeric materials. The corresponding non-ablatable crosslinked binder material can be obtained by crosslinking the noted thermally crosslinkable organic polymeric materials.

The non-ablatable crosslinked binder material formed from thermally crosslinked organic polymers can be present in the LTHC layer in an amount of at least 40 weight % and up to and including 90 weight %, or more likely in an amount of at least 50 weight % and up to and including 80 weight %, all based on total dry weight of the LTHC layer.

A third essential component of the LTHC layer are the non-ablatable particles, which are not ablatable by light radiation or resulting thermal heat from light radiation, and thereby the non-ablatable particles are considered to be non-thermally-ablatable particles. The non-thermally-ablatable particles are defined to be not thermally ablative under exposure to the light radiation during formation of the mask or formation of the relief image. The non-ablatable particles can include an average particle size of at least 0.1 µm and up to and including 20 µm, or at least 5 µm and up to and including 15 µm. The term "average" is used here to refer to measurements of particle size of the dispersed particles and can be determined from either a manufacturer's specification or by measuring at least 10 different particles and taking an average.

The term "non-ablatable" with regard to the non-ablatable particles is used here to mean that the particles are not sensitive to the laser imaging wavelength and intensity compared to materials that are strongly affected by the laser imaging ablation process of forming the mask. Also, the particles are not sensitive to UV radiation during formation of the relief image from the mask and the relief-forming precursor. Materials that are sensitive to the laser thermal imaging ablation process have strong absorption to the laser wavelength of the imaging laser and have low thermal decomposition temperatures so that they are ablative, and such materials are not used in the non-ablatable particles. Conversely, non-ablative particles used in the present invention are not strongly absorbing of the laser imaging wavelength and do not have very low thermal decomposition temperatures. Some of the non-thermally-ablatable particles can protrude out of the LTHC layer, for example, into the IL, but are retained in the LTHC layer or at least partially embedded therein.

The non-ablatable particles useful in the LTHC layer include but are not limited to, particles of silica, titanium dioxide, zinc oxide, or a combination of two or more types of such particles. Silica particles are particularly useful in the practice of this invention. Moreover, such non-ablatable particles can be present in the LTHC layer in an amount of at least 0.2 weight % and up to and including 10 weight %, or at least 1 weight % and up to and including 7 weight %, all based on the total dry weight of the LTHC layer.

Optionally, during formation the LTHC layer can comprise one or more thermal crosslinking agents to provide improved handling of the mask element. Such optional thermal crosslinking agents facilitate crosslinking of the thermally crosslinkable organic binder polymers during coating and drying of the LTHC layer to form the non-ablatable crosslinked binder. Heat can be used for drying during formation of the mask element. The thermal crosslinking agent(s) can be present in an amount of at least 5 weight % and up to and including 25 weight %, based on the total dry weight of the crosslinkable polymer that is crosslinked into the non-ablatable LTHC layer. Such materials can include but are not limited to, melamine-formaldehyde resins, dialdehydes, phenolics, polyfunctional aziridines, isocyanates including polyisocyanates, and urea-formaldehyde epoxies. However, the formed LTHC layer is a crosslinked binder so crosslinking agents can be all used or not present or only present in small amounts in the formed crosslinked material that is non-ablative.

The LTHC layer generally has an average dry thickness of at least 1 μm and up to and including 5 μm or typically at least 1 μm and up to and including 3 μm.

Non-silver Halide Thermally-Ablatable Imaging Layer (IL)

The IL that is incorporated into the mask precursor is generally disposed directly on the LTHC layer as a relatively uniform coating (that is, being substantially continuous and having fairly uniform wet thickness) and then dried if any solvent is present in the formulation. In most embodiments, IL is a single coated or applied layer, but in other embodiments, there can be multiple sub-layers or sub-coatings making up the IL disposed directly on the LTHC layer described above.

As stated in the terminology, there is essentially no silver halide present in the IL. In other words, no silver halide is purposely added or created in the IL.

The IL generally includes one or more ultraviolet radiation absorbing materials (UV-light absorbing materials) as an essential component. These compounds generally have an absorbance of at least 1.5 and up to and including 5 in an electromagnetic radiation wavelength range of at least 300 nm and up to and including 450 nm. In general, useful ultraviolet radiation absorbing materials include but are not limited to benzotriazoles, halogenated benzotriazoles, triazines, benzophenones, benzoates, salicylates, substituted acrylonitriles, cyanoacrylates, benzylidene malonate, oxalanilides, and mixtures thereof. Examples of useful ultraviolet radiation absorbing materials include but are not limited to, UV absorbing dyes or UV stabilizers marketed under the names Uvinul® (BASF), Keyplast® (Keystone Aniline Corporation), Sanduvor® (Sandoz Chemicals Corp.), Hostavin (Clariant), and Tinuvin® (BASF or Ciba). Examples of useful materials are described in U.S. Pat. No. 5,496,685 (Farber et al.).

The one or more ultraviolet radiation absorbing compounds can be present in the IL in an amount of at least 10 weight % and up to and including 40 weight %, or typically at least 15 weight % and up to and including 30 weight %, based on the total dry weight of the IL.

The IL also comprises one or more second infrared radiation absorbing materials as a second essential component, which second infrared radiation absorbing materials are defined like the first infrared radiation absorbing materials described above for the LTHC layer, and they can be the same or different as the first infrared radiation absorbing materials. The one or more second infrared radiation absorbing materials can be present in the IL in an amount sufficient to provide a transmission optical density of at least 0.5 and typically of at least 0.75 at the exposing wavelength. Generally, this is achieved by including at least 3 weight % and up to and including 20 weight % of the one or more second infrared radiation sensitive compounds, based on the total dry weight of the IL.

The IL can optionally include one or more fluorocarbon additives for improved production of halftone dots (that is, pixels) having well-defined, generally continuous, and relatively sharp edges. Examples of useful fluorocarbon additives and amounts are provided in to of U.S. '182 (noted above).

Additional optional components of the IL include but are not limited to, plasticizers, coating aids or surfactants, dispersing aids, fillers, and colorants, all of which are well known in the art as described for example in to of U.S. '182 (noted above). For example, the IL further can comprise one or more fluorocarbon additives or one or more non-thermally ablatable colorants.

All the essential and optional components described above for the IL are dispersed in one or more ablatable polymeric binder materials that include both synthetic and naturally occurring polymeric materials that are ablatable when exposed to light radiation, such as such as IR radiation, visible radiation, or UV radiation. In some aspects, the ablatable polymeric binder in the IL is not crosslinked, and thereby is a non-crosslinked binder. Such materials are capable of dissolving or dispersing the essential and optional components in a uniform manner throughout the IL. The one or more ablatable polymeric binder materials can be present in an amount of at least 25 weight % and up to and including 75 weight %, or typically of at least 35 weight % and up to and including 65 weight %, based on the total dry weight of the IL.

Useful ablatable polymeric binder materials include but are not limited to, the materials described for example in to of US '182. These materials can also be known as "adhesive binders" as described for example in of U.S. '182. Examples of such materials include but are not limited to, acetyl polymers such as poly(vinyl butyral)s that can be obtained for example as BUTVAR® B-76 from Solution, Inc. (St. Louis, Mo.) and acrylamide polymers that can be obtained as MACROMELT 6900 from Henkel Corp. (Gulph Mills, Pa.). Pressure-sensitive adhesive polymers can also be used for this purpose.

In some embodiments, it is advantageous to use binder materials in the IL that are easily thermally-combustible or thermally-ablatable, and that generate gases and volatile fragments at temperature less than 200° C. Examples of these materials are thermally ablatable nitrocellulose, polycarbonates, poly(cyanoacrylate)s, polyurethanes, polyesters, polyorthoesters, polyacetals, and copolymers thereof (see for example, U.S. Pat. No. 5,171,650 of Ellis et al., Col. 9, lines 41-50, the disclosure of which is incorporated herein by reference), which can be non-crosslinked.

Other useful ablatable materials for the IL have hydroxyl groups (or hydroxylic polymers) as described in to of U.S. '182 (noted above) such as poly(vinyl alcohol)s and cellulosic polymers (such as nitrocellulose). Still other useful polymers are non-crosslinkable polyesters, polyamides, polycarbamates, polyolefins, polystyrenes, polyethers, polyvinyl ethers, polyvinyl esters, and polyacrylates and polymethacrylates having alkyl groups with 1 and 2 carbon atoms.

Particularly useful abatable materials for the IL include but are not limited to, a polyurethane, poly(vinyl butyral), (meth)acrylamide polymer, nitrocellulose, polyacetal, poly (cyanoacrylate), a polymer derived at least in part from any of methyl methacrylate, ethyl methacrylate, n-butyl methacrylate, and isobutyl methacrylate, or a combination of two or more of these materials.

The IL can have an average dry thickness of at least 0.5 μm and up to and including 5 μm or typically of at least 0.8 μm and up to and including 2.5 μm.

Transparent Polymeric Overcoat Layer

In some embodiments, the mask precursor optionally includes a transparent polymeric overcoat layer that is disposed directly on the IL opposite of the LTHC layer. Although such a transparent polymeric overcoat layer is not essential to the advantages of the present invention. The transparent polymeric overcoat layer generally includes one or more transparent film-forming polymers or resins including but not limited to, a methacrylic acid copolymer (such as a copolymer of ethyl methacrylate and methacrylic acid) and particles of one or more fluoropolymers dispersed therein as described, for example, in U.S. Pat. No. 6,259,465 (Tutt et al.) the disclosure of which is incorporated herein by reference. The transparent polymeric overcoat layer can provide abrasion resistance during handling due to the presence of the fluoropolymer particulates. It can also act as a barrier to prevent chemical migration from the mask element to the relief-forming precursor when they are in complete optical contact.

When present, the transparent polymeric overcoat layer can be attached directly to the IL and can have an average dry thickness of at least 0.05 μm and up to and including 1 μm.

Forming Mask Elements

In some embodiments, a mask can be formed by producing exposed and non-exposed regions in the IL of the mask precursor described herein. The choice of imaging mechanism will determine the possible variations in forming the mask image, as described below.

Exposing the mask precursor to ablative light energy to ablate the IL layer can be carried out in selected regions, otherwise known as "imagewise exposure", such as the print blocks of the grid of the highlight microdot printhead. In some embodiments, imagewise exposure can be accomplished using thermal radiation from a thermal or infrared laser that is scanned or rasterized under computer control. Any of the known scanning devices can be used including flat-bed scanners, external drum scanners, and internal drum scanners. In these devices, the mask precursor material is secured to the drum or bed, and the laser beam is focused to a spot that can impinge on the IL of the mask precursor material. Two or more lasers can scan different regions of the IL simultaneously.

For example, the mask precursor material can be exposed to infrared radiation, for example, in the electromagnetic wavelength range of at least 700 and up to and including 1500 nm. Such mask precursor materials contain one or more second infrared radiation absorbing materials in the IL as described above to provide sensitivity to infrared radiation. In these embodiments, the mask precursor material can be suitably mounted to an infrared imager and exposed to the infrared radiation using an infrared laser such as a diode laser or Nd:YAG laser that can be scanned under computer control. Suitable infrared imagers include but are not limited to TRENDSETTER imagesetters and ThermoFlex Flexographic CTP imagers available from Eastman Kodak Company used for CTP lithographic plate applications and for imaging flexographic elements, DIMENSION imagesetters available from Presstek (Hudson, N.H.) useful for CTP lithographic plate applications, CYREL® Digital Imager (CDI SPARK) available from Esko-Graphics (Kennesaw, Ga.), and OMNISETTER imagers available from Misomex International (Hudson, N.H.) useful for imaging flexographic elements.

Figure 8B:
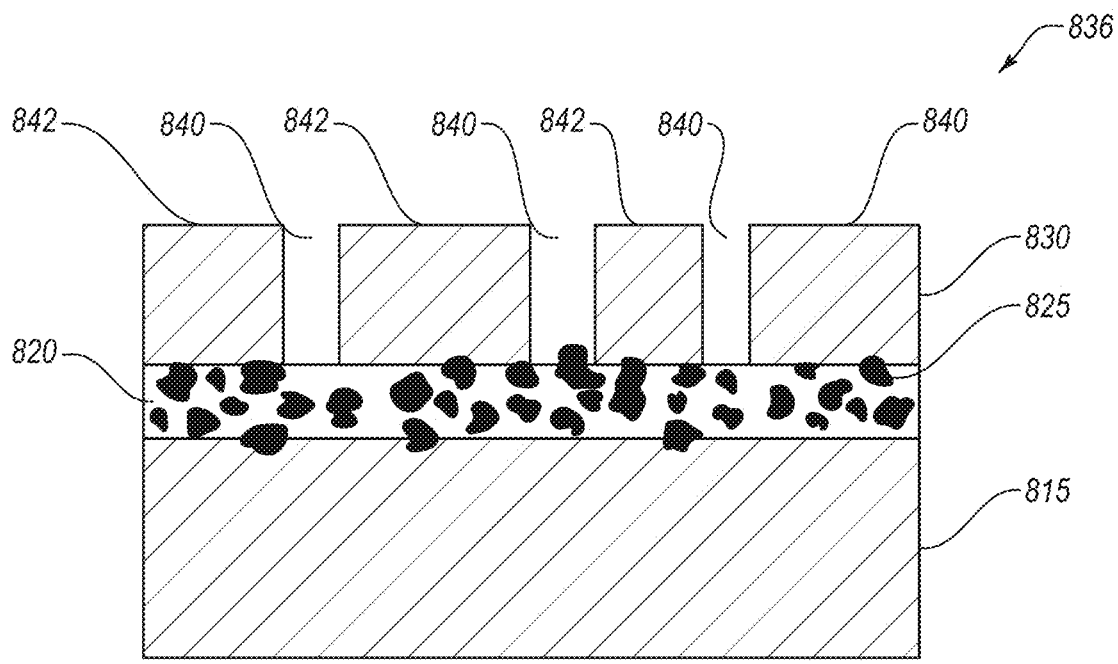
FIG. 8B is a cross-sectional schematic illustration of an embodiment of a mask element formed from the mask precursor illustrated in FIG. 8A.

This exposing step is illustrated for some embodiments in FIG. 8A in which mask precursor material 810 is exposed to exposing infrared radiation 835 in an imagewise pattern in the blocks that are either print blocks or blank blocks to provide exposed regions 840 and non-exposed regions 842 as illustrated in mask element 836 shown in FIG. 8B and corresponding to a mask image. As shown, the exposed regions 840 are ablated (print blocks) and are removed from the non-exposed regions 42 (blank blocks). As such, the exposed regions form the mask image.

The step of forming the mask image can also include a step of removing either exposed or non-exposed regions from the IL if desired. In some embodiments, exposed regions of the IL are removed for example by ablating away the exposed material(s) in the IL. In this mechanism, the exposed regions of the IL are removed from the mask element by the generation of a gas during ablation to leave a mask image. Specific binders (e.g., non-crosslinked) that decompose upon exposure to heat (such as that produced by IR laser irradiation) to rapidly generate a gas can be present in the IL. This action is to be distinguished from other mass transfer techniques in that a chemical rather than a physical change causes an almost complete transfer of the IL rather than a partial transfer.

In other embodiments not illustrated, a mask image can be formed on the carrier sheet (and LTHC layer disposed thereon) by producing exposed and non-exposed regions in the IL and selectively removing the non-exposed regions.

In some embodiments, the mask image in the IL of the mask element can be cured by subjecting it to heat treatment, provided that the properties of the mask element are not adversely affected. Heat treatment can be carried out by a variety of means including but not limited to, storage in an oven, hot air treatment, or contact with a heated platen or passage through a heated roller device. Heat treatment is not necessary for curing to take place.

In still other embodiments, a mask image can be formed in the IL as noted above and the exposed regions can be transferred to a receptor sheet that is then removed from the mask element before it is brought into contact with to a relief-forming precursor. Such procedures are well known in the art.

In a peel-apart imaging mechanism, the exposed regions of the IL can be removed from the carrier sheet (and LTHC layer disposed thereon) using a suitable receptor sheet based on differential adhesion properties in the IL. After imagewise exposure of the mask precursor, the receptor sheet is separated from the carrier sheet and either exposed or non-exposed regions remain in the mask element.

Relief-Forming Precursor

In some embodiments, relief-forming precursors are prepared and then formed into relief-imaged flexographic printing plates having the highlight regions with the highlight microdot structures that have the print surface pattern. Considerable details of useful relief-forming precursors, such as flexographic printing plate precursors, letterpress printing plate precursors, and printed circuit boards are provided in U.S. '182 (noted above). Such relief-forming precursors can include a suitable dimensionally stable substrate and a relief-forming layer that is UV (ultraviolet)-sensitive, and optionally a coversheet and/or metal layer between substrate and relief-forming layer. Suitable substrates include dimensionally stable polymeric films and aluminum sheets. Polyester films are particularly useful. Any UV-sensitive material or element in which a relief image can be produced using a mask element is useful in the practice of this invention when it can form a highlight dot printhead having a pattern. The patterned highlight dot printhead can print the highlight dot as described herein for better highlight dot control and fading.

Figure 8C:
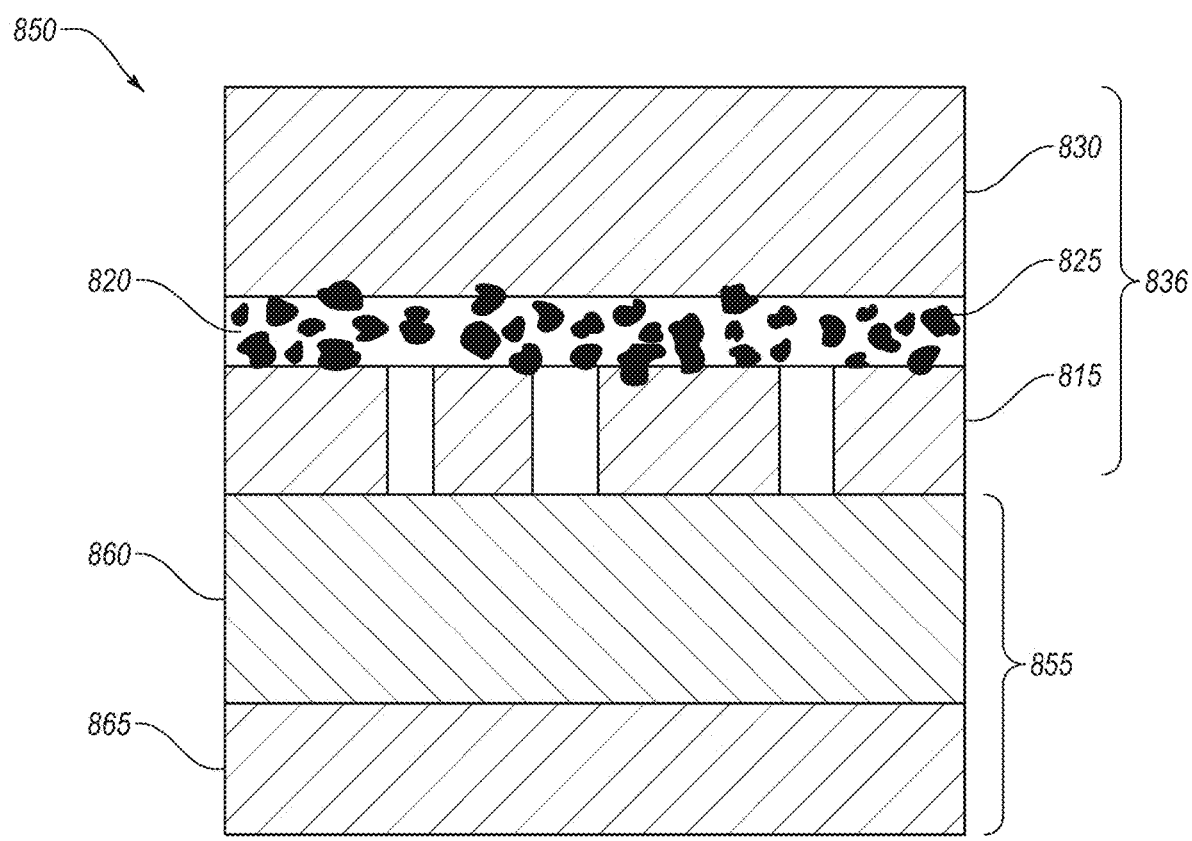
FIG. 8C is a cross-sectional schematic illustration of an embodiment of a relief image-forming assembly according to the present invention, comprising a mask element as illustrated in FIG. 8B that is in complete optical contact with a relief-forming precursor.
Figure 8D:
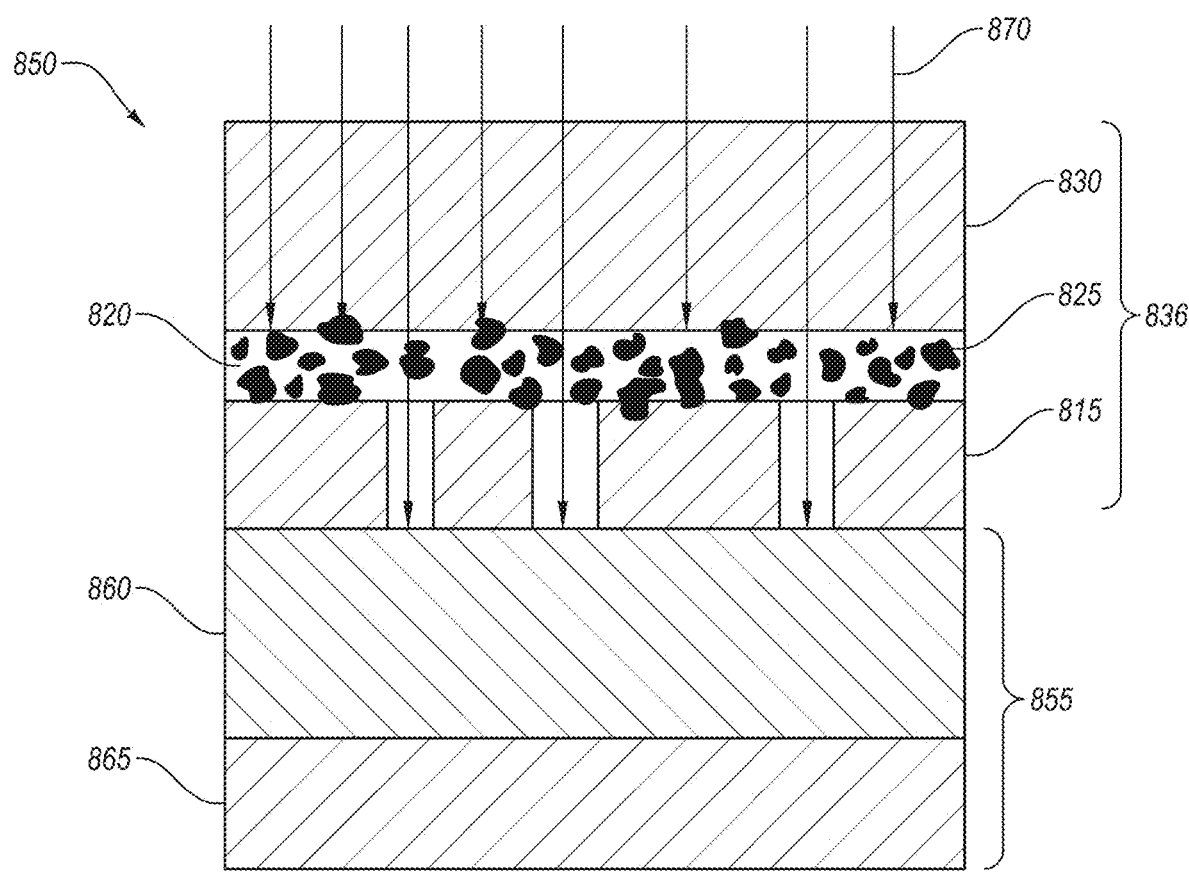
FIG. 8D is a cross-sectional schematic illustration of an embodiment of forming an imaged relief-forming precursor using incident UV radiation through the mask element illustrated in FIG. 8B.
Figure 8E:
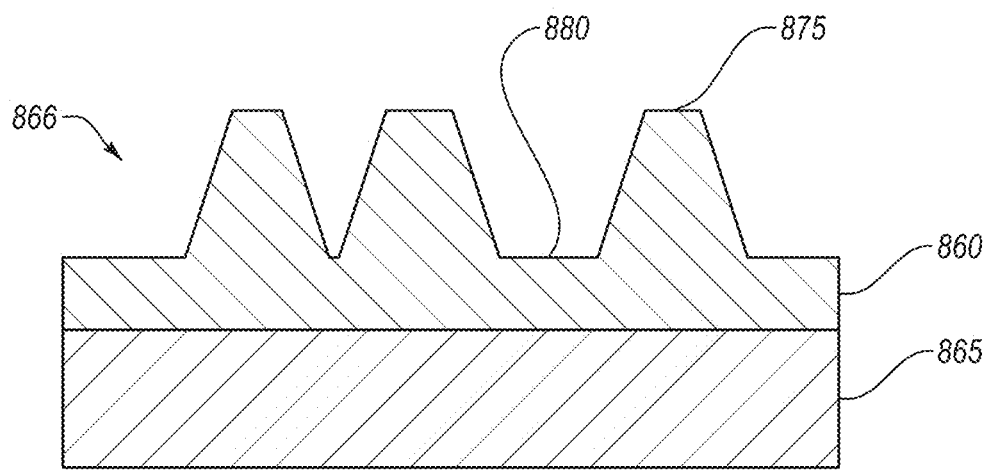
FIG. 8E is a cross-sectional schematic illustration of an embodiment of a relief image element provided after imaging illustrated in FIG. 1D and suitable development process to remove non-exposed regions in the UV-sensitive layer of the imaged relief-forming precursor.

FIG. 8C-8D shows that the relief-forming precursor 855 includes the UV-sensitive layer 860 (e.g., photosensitive relief-forming layer having the low surface energy additive and that is sensitive to curing UV radiation) that is typically carried on substrate 865. Accordingly, the resulting flexographic printing plate 866 as shown in FIG. 8E having the highlight microdot structures 875 in the UV-sensitive layer 860 above the valleys 880.

In some embodiments, relief-forming precursors generally include a suitable dimensionally stable substrate, a radiation curable layer in which a flexographic relief image can be formed, and optionally a cover sheet on the radiation curable layer and/or metal layer between the substrate and radiation curable layer can be provided (e.g., illustrated as the interfaces between the layers). Suitable substrates include flexible, dimensionally stable transparent polymeric films as well metal substrates, such as aluminum sheets. Polyester films are particularly useful as flexible, dimensionally stable, transparent substrates. The relief-forming precursor can optionally include a metal layer disposed between the substrate and the radiation curable layer. This metal layer can include copper or another metal or metal alloy.

In some embodiments, the radiation curable layer can be a UV-sensitive layer that is cured by UV light. In some aspects, the UV-sensitive layer can be at least one layer of a relief-forming precursor that is formed by a relief-forming material that is UV-sensitive. Thus, references to the relief-forming material or layer refers to the UV-sensitive material or layer that can be irradiated with UV light and developed into a relief image.

Figure 9:
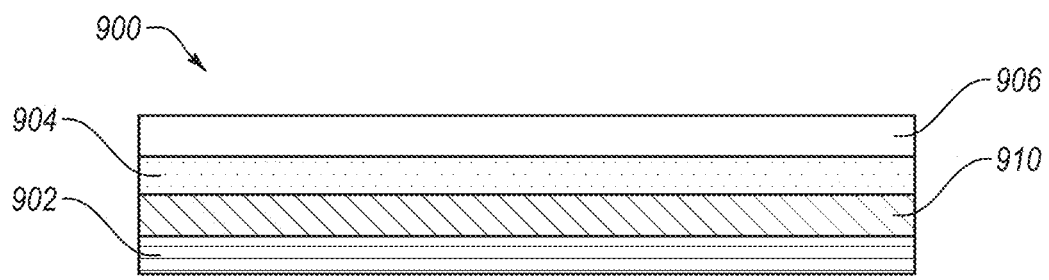
FIG. 9 is a cross-sectional schematic illustration of a relief-forming precursor plate.

In some embodiments, the relief-forming precursor 900 of FIG. 9 includes: a backing or base film 902 (e.g., as a substrate), a relief-forming layer (e.g., UV-sensitive material) 904; and optionally a removable coversheet film 906 to protect the photosensitive layer. In another option, a metal layer 910 can be located between the substrate and the relief-forming layer.

In some embodiments, the backing or base can be configured to provide support to the relief-forming layer of the relief-forming precursor. The backing layer can be formed from transparent or opaque material such as paper, cellulose film, plastic, or metal. The backing layer is preferably formed from a transparent material that is flexible. Examples of such materials are cellulose films or plastics such as, PET (polyethylene terephthalate), PEN (polyethylene naphthalate), polyether, polyethylene, polyamide (Kevlar), or nylon. Preferably, the support layer is formed from polyethylene terephthalate (PET). It was also found that the relief-forming layer having the low surface energy additive was able to adhere to the support layer. The support layer can be from about 0.001 to about 0.010 inches thick. Optionally, various layers, such as an antihalation layer and/or an adhesive layer may be positioned between the backing layer and the relief-forming layer. In some aspects, the adhesive layer can include an antihalation material (e.g., light absorbing substance to prevent refraction of light) or may exclude such an antihalation material.

In some embodiments, the relief-forming layer can be a UV light photosensitive material that forms a relief image upon imaging with UV light and developing the image, where the relief image has highlight dot printheads that are patterned to provide improve highlight printing. In some embodiments, the photosensitive material can include a low surface energy material that can provide a number of desirable properties to a relief image forming protocol, such as easier vacuum drawdown and better lamination to reduce bubble formation. Additionally, the reduced peel force allows for easier removal of the imaged mask from the relief-forming layer after the main UV exposure to form the relief image. Now, the protocol can be performed by peeling the mask from the imaged relief-forming layer. The improved separation from the reduced surface energy and reduced peel force can be applied to larger plate sizes, which are needed for commercial applications. Thus, the photosensitive relief-forming material having the reduced surface energy and reduced peel force provides easier separation of the mask element and photopolymer plate precursor assembly.

In some embodiments, the reduced surface energy and reduced peel force is obtained by incorporating a low surface energy additive into the composition of the photosensitive material. The low surface energy additive can be included within the matrix of the photosensitive material so as to be present and distributed within the body and on the surface of the photosensitive material. Often, the low surface energy additive is homogeneously mixed within the photosensitive material. However, the additive may be provided randomly or heterogeneously (e.g., non-homogeneously) or in gradients with increasing concentration preferentially to one side or the other.

In some embodiments, the low surface energy additive can include a silicone material, such as a silicone-based monomer having a reactive functional group. The reactive functional group can be selected to be polymerizable with the other polymerizable monomers of the photosensitive material. This allows the silicone to be incorporated into the polymerized material so that it is retained to the portion of the photosensitive material that remains after the relief forming process. As a result, the reactive functional group can be tailored from well-known functional groups that can participate in a polymerization reaction with specific types of other monomers that have the same functional groups or different but suitably reactive functional groups.

The low surface energy additive provides easer separation of the mask from the relief-forming precursor. It also provides a lower surface energy to the relief image layer of the flexographic printing plate which may provide additional benefits for printing. This can reduce damage to a highlight dot printhead or the pattern thereof.

In some embodiments, the silicone material of the low surface energy additive can include an acrylate functional group that can be reactive during polymerization. While acrylate (e.g., with hydrogen on the a carbon) may be used, other acrylates with substituents on the a carbon may also be used. The other acrylates can be substituted acrylates with the substituent being at the a carbon. A common example includes methacrylate that has the methyl on the a carbon. The silicone moiety can be attached to the oxygen of the ester of the acrylate moiety. The silicone moiety can include a linker to the oxygen of the ester.

In some embodiments, the silicone material can include a polydimethylsiloxane (PDMS) backbone with an alkyl or alkoxy side chain and with an acrylate group, such as acrylate or methacrylate. Such silicone acrylate additives are commercially available from various suppliers and may be referred to as a TEGO RAD (silicone polyether acrylate), such as TEGO RAD 2250, TEGO RAD 2300, TEGO RAD 2500, TEGO RAD 2700, CN9800 (difunctional aliphatic silicone acrylate oligomer), EBECRYL 350 (silicone di-acrylate) or the like.

In some embodiments, the silicone moiety can be a mono-acrylate, di-acrylate, tri-acrylate, or other multi-acrylate. Di-acrylates and above can be involved in crosslinking with the polymerizable monomers. As a result, the polymerization can result in crosslinking by using the silicone multi-acrylate monomer as the low surface energy additive. Thus, the formation of the imaged UV-sensitive material can include crosslinking the monomers with the silicon multi-acrylate monomer In some embodiments, the low surface energy additive is not a silicone oil. That is, the low surface energy additive is not a silicone that is free within the material. Instead, embodiments include the low surface energy additive having the reactive functional group that can participate in polymerization so that the silicone is covalently coupled to the polymerized material. In some aspects, the low surface energy additive is polymerized upon exposure to the UV curing radiation. For example, the silicone acrylate or silicone methacrylate can be used.

In some embodiments, the low surface energy additive, such as the silicone acrylate, can be included in the UV-sensitive material in an amount ranging from about 0.1% to about 5% by weight of the material, or ranging from about 0.2% to about 4% by weight, about 0.3% to about 3% by weight, or ranging from about 0.4% to about 2% by weight, or ranging from about 0.5% to about 1%, or any range of the recited endpoints, such as 0.5% to about 2%, etc.

In some embodiments, the low surface energy additive can be distributed throughout the matrix. In some aspects, the low surface energy additive may be added to a top surface of the UV-sensitive material.

The photosensitive layer can be in a relief-forming precursor that is positive- or negative-working, but typically, it is negative-working, and generally includes a UV-sensitive layer (or photocurable or relief-image forming layer or photosensitive layer, etc.) containing a UV-radiation curable composition that is cured or hardened by polymerization or crosslinking upon exposure to the curing UV radiation.

Many details of various components of the UV-sensitive relief-forming precursors are provided in U.S. '182 (noted above) and references cited therein.

In some embodiments, the photosensitive material can be a UV-sensitive layer that includes: an elastomeric binder; at least one polymerizable or photocurable monomer; a photopolymerizing photoinitiator that is sensitive to UV radiation; and a low surface energy monomer, such as the polymerizable silicone material described herein. Suitable photoinitiator compositions include but are not limited to those described in U.S. Pat. No. 4,323,637 (Chen et al.), U.S. Pat. No. 4,427,749 (Graetzel et al.), and U.S. Pat. No. 4,894,315 (Feinberg et al.). The low surface energy monomer can be added to the photoinitiator compositions to form the photosensitive material with reduced surface energy and reduced peel force.

The elastomeric binder can include more polymers or resins that can be soluble, swellable, or dispersible in aqueous, semi-aqueous, or organic solvent developers (described below) and can include but are not limited to, natural or synthetic polymers of conjugated diolefins, block copolymers, core-shell microgels, and blends of microgels and preformed macromolecular polymers. The elastomeric binder can comprise at least 65 weight % and up to and including 90 weight %, based on total dry UV-sensitive layer weight.

In some embodiments, the elastomeric binder may be a single polymer or mixture of polymers (e.g., homopolymers, copolymers, random copolymers, block copolymers, any with any number of different types of monomers) which may be soluble, swellable or dispersible in aqueous, semi-aqueous or organic solvent developers. Suitable binders include those described in, U.S. Pat. No. 3,458,311 (Alles), U.S. Pat. No. 4,442,302 (Pohl), U.S. Pat. No. 4,361,640 (Pine), U.S. Pat. No. 3,794,494 (Inoue), U.S. Pat. No. 4,177,074 (Proskow), U.S. Pat. No. 4,431,723 (Proskow), and U.S. Pat. No. 4,517,279 (Worns). Binders which are soluble, swellable or dispersible in organic solvent developers include natural or synthetic polymers of conjugated diolefin hydrocarbons, including polyisoprene, 1,2-polybutadiene, 1,4-polybutadiene, butadiene/acrylonitrile, butadiene/styrene thermoplastic-elastomeric block copolymers and other copolymers. The block copolymers discussed in U.S. Pat. No. 4,323,636 (Chen), U.S. Pat. No. 4,430,417 (Heinz), and U.S. Pat. No. 4,045,231 (Toda) may be used. The elastomeric binder may be present in an amount of at least about 65% by weight of the photosensitive material. The term binder, as used herein, encompasses core-shell microgels and blends of microgels and preformed macromolecular polymers, such as those described in U.S. Pat. No. 4,956,252 (Fryd).

The at least one polymerizable monomer can be configured to be compatible with the elastomeric binder to the extent that a clear, non-cloudy UV-sensitive imageable layer is produced. Polymerizable monomers for this purpose are well known the art and include ethylenically unsaturated polymerizable compounds having relatively low molecular weight (generally less than 30,000 Daltons). Suitable monomers have a relatively low molecular weight, less than about 5000 Da. Unless described otherwise, throughout the specification molecular weight is the weight-average molecular weight. Examples of suitable polymerizable monomers include various mono- and polyacrylates, acrylate derivatives of isocyanates, esters, and epoxides. Additionally, examples of suitable monomers include t-butyl acrylate, lauryl acrylate, the acrylate and methacrylate mono- and polyesters of alcohols and polyols such as alkanols, e.g., 1,4-butanediol diacrylate, 2,2,4-trimethyl-1,3 pentanediol dimethacrylate, and 2,2-dimethylolpropane diacrylate, alkylene glycols, e.g., tripropylene glycol diacrylate, butylene glycol dimethacrylate, hexamethylene glycol diacrylate, and hexamethylene glycol dimethacrylate, trimethylol propane, ethoxylated trimethylol propane, pentaerythritol, e.g., pentaerythritol triacrylate, dipentaerythritol, and the like. Other examples of suitable monomers include acrylate and methacrylate derivatives of isocyanates, esters, epoxides and the like, such as decamethylene glycol diacrylate, 2,2-di(p-hydroxyphenyl)propane diacrylate, 2,2-di(p-hydroxyphenyl)propane dimethacrylate, polyoxyethyl-2,2-di(p-hydroxyphenyl)propane dimethacrylate, and 1-phenyl ethylene-1,2-dimethacrylate. Further examples of monomers can be found in U.S. Pat. No. 4,323,636 (Chen), U.S. Pat. No. 4,753,865 (Fryd), U.S. Pat. No. 4,726,877 (Fryd), and U.S. Pat. No. 4,894,315 (Feinberg). The monomer may comprise at least 5% by weight to about 25% by weight of the photosensitive material, which can be based on total dry weight of the photosensitive material.

The photoinitiator may be any single compound or combination of compounds sensitive to ultraviolet radiation, generating free radicals which initiate the polymerization of the monomer or monomers without excessive termination. The photoinitiator can be sensitive to visible or ultraviolet radiation. The photoinitiator may also be insensitive to infrared and/or visible radiation and can be thermally inactive at and below 185° C. Examples of suitable photoinitiators include the substituted and unsubstituted polynuclear quinones. Examples of suitable systems have been disclosed in U.S. Pat. No. 4,460,675 (Gruetzmacher) and U.S. Pat. No. 4,894,315 (Feinberg). Photoinitiators are generally present in amounts from 0.001% to 10.0% by weight based on the weight of the photosensitive material.

In some embodiments, the photosensitive layer can include: a di- or tri-block co-polymer (e.g., elastomer); at least one photopolymerizable monomer; photopolymerization initiator; plasticizer; additives such as stabilizers, inhibitors, colorants, solvents; and the low surface energy monomer, such as, a silicone acrylate or silicone methacrylate.

In some embodiments, the plasticizer can be any suitable plasticizer known in the art of photosensitive layers for use as described herein. Examples of suitable plasticizers include aliphatic hydrocarbon oils, e.g., naphthenic and paraffinic oils, liquid polydienes, e.g., liquid polybutadiene, liquid polyisoprene. Generally, plasticizers are liquids having molecular weights of less than about 5,000 Da, but can have molecular weights up to about 30,000 Da. Plasticizers having low molecular weight will encompass molecular weights less than about 30,000 Da.

In some embodiments, the additives can include rheology modifiers, thermal polymerization inhibitors, stabilizers, inhibitors, tackifiers, colorants, antioxidants, antiozonants, solvents, or fillers. These materials are commonly used in photosensitive layers and examples can be provided in the incorporated references.

The thickness of the photosensitive layer may vary depending upon the type of printing plate desired. In one embodiment, the photosensitive layer may be, for example, from about 20-250 mils (500-6,400 microns) or greater in thickness, more particularly from about 20-100 mils (500-2,500 microns) in thickness.

In some embodiments, the relief-forming precursor is a flexographic printing plate precursor that includes a suitable UV-curable composition (e.g., photosensitive material) in the UV-sensitive layer (e.g., photosensitive layer) that when exposed through the mask element and developed, provides a relief image in a flexographic printing plate. Such relief-forming precursors generally include a suitable substrate with the photosensitive material. Examples of commercially available flexographic printing plate precursors include but are not limited to, FLEXCEL NX flexographic elements available from Miraclon Corporation, CYREL® Flexographic plates available from DuPont (Wilmington, Del.), NYLOFLEX® FAR 284 plates available from BASF (Germany), FLEXILIGHT CBU plate available from Macdermid (Denver, Co.), and ASAHI AFP XDI available from Asahi Kasei (Japan). These flexographic printing plate precursors can be modified to include the low surface energy monomer as described herein.

In some embodiments, the relief-forming precursor can also be used to form a printed circuit board wherein a conducting layer (also known as a "printing circuit") is formed on a substrate in the pattern dictated by exposure through a mask element. Suitable precursors to printed circuit boards generally comprise a substrate, a metal layer, and a UV-sensitive imageable layer (e.g., photosensitive material). Suitable substrates include but are not limited to, polyimide films, glass-filled epoxy or phenol-formaldehyde or any other insulating materials known in the art. The metal layer covering the substrate is generally a conductive metal such as copper or an alloy or metals. The UV-sensitive imageable layer can include an UV-curable resin, polymerizable monomers, or oligomers, photoinitiators, and a polymeric binder. Further details of printed circuit boards are provided in U.S. '182 (noted above).

Forming Relief Images

After a mask element and relief-forming precursor are both formed as described above, the mask element is brought into complete optical contact with the relief-forming precursor that includes the photosensitive layer having the low surface energy additive and that is sensitive to curing UV radiation. This protocol can be accomplished by placing the mask element onto the relief-forming precursor or vice versa, as described below in more detail. For example, the contact and coupling of the mask element to the relief-forming precursor can be performed by using lamination equipment and processing. Vacuum drawdown of the mask element onto the relief-forming precursor can also be carried out, with or without lamination, to achieve desired complete optical contact.

Some embodiments according to the present invention can be understood by reference to the general illustrations provided in the sequence of FIG. 8A through FIG. 8E. As described above, FIG. 8A illustrates mask precursor 810 that is exposed to exposing infrared radiation 835 to form mask element 836 (FIG. 8B).

In FIG. 8C, mask element 836 includes the IL layer 815 over the LTHC layer 820 (e.g., with non-ablatable particles) that is over the ablated IL layer 830 that has the mask image formed therein. The mask element 836 is shown in intimate or complete optical contact with a relief-forming precursor 855 to provide relief-image forming assembly 850. Relief-forming precursor 855 includes the UV-sensitive layer 860 (e.g., photosensitive relief-forming layer having the low surface energy additive and that is sensitive to curing UV radiation) that is typically carried on substrate 865.

FIG. 8D shows the step of exposing the relief-image forming assembly 850 to UV radiation 870 shown by the arrows. The UV radiation 870 passes through the transparent polymeric carrier sheet 815, the LTHC layer 820, and the exposed regions (e.g., element 840—removed IL layer portions) of IL 830 in the mask element 836 to cause photocuring in UV-sensitive layer 860 of the relief-forming precursor 855.

After the UV-exposure, mask element 836 can be removed from the UV-sensitive layer 860 of the relief-forming precursor 855 and a development protocol can provide a relief image (FIG. 1E) in the UV-sensitive layer 860. As shown, the relief image includes relief image peaks 875 (e.g., highlight microdot structures) and relief image valleys 880 in the UV-sensitive layer 860.

Lamination

As noted above, the mask element and relief-forming precursor can be placed in complete optical contact so as to provide an air-free interface at the shared interface. Generally, this is achieved by laminating the mask element to the UV-sensitive layer of the relief-forming precursor by applying suitable pressure or heat, or both pressure and heat to form an air-free or gap-free interface prior to UV exposure. However, when the relief-forming precursor includes the UV-sensitive, the laminating procedure may be not needed. As noted above, vacuum drawdown of the masking element onto the relief-forming precursor can then be useful.

Commercially available laminators that provide both heat and uniform pressure can be used including but not limited to, KODAK model 800XL APPROVAL LAMINATOR available from Eastman Kodak Company (Rochester, NY). CODOR LPP650 LAMINATOR available from CODOR (Amsterdam, Holland), and LEDCO HD laminators available from Filmsource (Casselbury, FL) can also be useful. If a transparent polymeric overcoat layer is attached directly to the IL of the mask element material, it can be removed before lamination or other operations of forming complete optical contact of mask element with the relief-forming precursor. The relief-image forming assembly formed by coupling the mask element and the relief-forming precursor can be fed into the laminator at a desired speed, temperature, and pressure.

Useful lamination (laminator) devices and methods for using them are described for example in U.S. Pat. No. 7,802,598 (Zwadlo et al.), the disclosure of which is incorporated herein by reference. As noted therein, a pre-press flexographic plate laminator can be used to laminate a mask element ("masking film") on a relief-forming precursor ("pre-press flexographic printing plate") by applying a balanced, non-distorting, optimized laminating force to achieve complete optical contact while minimizing lateral distortion.

In some embodiments, the relief-forming precursor does not have a separation layer, spacer layer, or anti-tack layer over the UV-sensitive relief-forming layer, and thereby pressure alone can be sufficient to achieve an air-free interface, as the relief-forming layer having the low surface energy additive within the relief-forming layer can still be tacky, or act as a pressure sensitive adhesive, due to the presence of polymerizable monomers. The amount of the low surface energy additive can be modulated within the parameters defined herein to obtain a desired or optimal amount of tackiness. Too much low surface energy monomer can cause a less tacky surface, and then hot lamination may be used to provide the optical contact coupling with the mask.

UV Exposure

After complete optical contact has been achieved between the mask element and the relief-forming precursor as described above, the relief-forming precursor can be exposed to curing UV radiation through the mask element to form an imaged relief-forming precursor with exposed regions and non-exposed regions in the UV-sensitive layer. The exposed regions are cured and solidified by polymerization of the monomers in the UV-sensitive layer. The non-exposed regions remain uncured and the monomers are not polymerized. Thus, the uniformly emitted curing UV radiation is projected onto the relief-forming precursor through the mask image that preferentially blocks some of the ultraviolet radiation by the remaining portions of the IL layer. In unmasked (exposed) regions, the curing UV radiation will cause hardening or curing of the UV-sensitive composition(s) in the IL. The mask image is therefore substantially opaque to the exposing or curing UV radiation, meaning that the mask image should have a transmission optical density of 2 or more and typically 3 or more in the non-exposed regions. The remaining portion of the IL layer still include the UV sensitive material to absorb the UV light and block it. The unmasked (exposed) regions of the UV-sensitive composition can be substantially transparent meaning that they should have a transmission optical density of 0.5 or less, or even 0.1 or less, and more typically at least 0.5 and up to and including 0.1 or at least 0.1 and up to and including 0.3. Transmission optical density can be measured using a suitable filter on a densitometer, for example, a MACBETH TR 927 densitometer.

Generally, exposure of the relief-forming precursor through the mask element is accomplished by floodwise exposure from suitable irradiation sources of UV radiation. Exposure can be carried out in the presence of atmospheric oxygen. Exposure under vacuum is not necessary as complete optical contact has already been made.

In the manufacture of a relief imaging element, such as a flexographic printing plate, one side of the relief-forming precursor can be generally first exposed to curing UV radiation through its transparent substrate (known as "back exposure") to prepare a thin, uniform cured layer (e.g., relief image valleys 880) on the substrate side of the UV-sensitive layer. The relief-forming precursor is then exposed to curing UV radiation through the mask element containing the mask image, thereby causing the UV-sensitive to harden or cure in the unmasked (exposed) regions. Unexposed and uncured regions of the UV-sensitive layer can then be removed by a developing process (described below), leaving the cured or hardened regions (e.g., relief image peaks 75) that define the relief image printing surface of a predetermined desired pattern of shapes and sizes of peaks 875 (e.g., highlight microdot structure) and valleys 880. The back exposure can be performed either before or after complete optical contact is made between the mask element and the relief-forming layer.

The wavelength or range of wavelengths suitable as the curing UV radiation will be dictated by the electromagnetic sensitivity of the relief-forming layer. In some embodiments, the UV curing radiation can have one or more wavelengths in the range of at least 150 nm and up to and including 450 nm, or more typically of at least 300 nm and up to and including 450 nm. Sources of UV radiation for floodwise or overall exposure include but are not limited to, carbon arcs, mercury-vapor arcs, fluorescent lamps, electron flash units, and photographic flood lamps. UV radiation is particularly useful from mercury-vapor lamps and sun lamps. Representative UV radiation sources include SYLVANIA 350 BLACKLIGHT fluorescent lamp (FR 48T12/350 VL/VHO/180, 115 watts) that has a central emission wavelength of about 354 nm that is available from Topbulb (East Chicago, Ind.), and BURGESS EXPOSURE FRAME, Model 5K-3343V511 with ADDALUX 754-18017 lamp available from Burgess Industries, Inc. (Plymouth, Mass.). The SQUAREspot laser with UV wavelength can also be used, such as to form the highlight microdot print surface pattern.

Other suitable sources of UV radiation include platemakers that can be used to both expose the relief-forming precursor to radiation and to develop the imaged relief-forming material after radiation exposure. Examples of suitable platemakers include but are not limited to, KELLEIGH MODEL 310 PLATEMAKER available from Kelleigh Corporation (Trenton, N.J.) and the GPP5OOF PLATE PROCESSOR available from Global Asia Ltd. (Hong Kong).

The time for exposure through the mask element will depend upon the nature and thickness of the UV-sensitive layer of the relief-forming precursor and the source of the and strength of the UV radiation. For example, in one of embodiment, a FLEXCEL-SRH plate precursor available from Eastman Kodak Company can be mounted on a KELLEIGH MODEL 310 PLATEMAKER and back exposed to UV-A radiation through the transparent support for about 20 seconds to prepare a thin, uniform cured layer on the support side of the relief-forming precursor. The relief image forming assembly of mask element and relief-forming precursor can then be exposed to UV radiation through the mask element for about 14 minutes. The mask image information is thus transferred to the relief-forming precursor (such as a flexographic plate precursor).

Separating Mask From UV-Sensitive Layer

In general, the methods described herein can also include removing the mask element from complete optical contact with the imaged relief-forming precursor after the UV exposure and before developing. This can be done using any suitable manner, such as peeling the two elements apart. For example, this can be accomplished by pulling the mask element away from the imaged relief-forming precursor.

In some embodiments, after the UV exposure, the mask element can be removed from the relief-forming layer by peeling the mask element from the relief-forming layer. This can be performed by providing support to one of the mask element or relief-forming precursor, and then applying a pulling force to an edge or end of the other of the mask element or relief-forming precursor (e.g., the relief-forming layer). The low surface energy additive can provide for the lower surface energy and lower peel force so that the separation is easier without damaging the mask element of the relief-forming layer. As such, the peeling or separation facilitated by the lower surface energy and lower peel force can inhibit delamination of the mask element, which allows for the mask element to be reused. Also, the lower surface energy and lower peel force can inhibit degradation and undesirable breakage of the peaks of the relief-forming layer.

In some embodiments, the mask element can be delaminated from the relief-forming precursor, such as by being delaminated from the relief-forming layer. In these embodiments, the mask element is laminated to the relief-forming layer. Then, the mask is delaminated from the relief-forming layer after the UV curing. However, such delamination is not intended to indicate that the mask itself delaminates so that the different layers of the mask element are delaminated from each other. Here, the mask element is delaminated in whole from the relief-forming layer due to the presence of the low surface energy additive. Thus, while the mask is delaminated from the relief-forming layer, the mask itself is not delaminated and damaged. Similarly, the relief-forming layer is not delaminated from the relief-forming precursor.

In some embodiments, the relief-forming precursor can omit a transparent release layer on the UV-sensitive layer.

Now, the low surface energy additive can provide for the easier release of the mask from the relief-forming precursor. Thus, the UV-sensitive relief-forming layer can be in direct contact with the mask element, such that separation separates the mask directly from the relief-forming layer. The low surface energy additive can reduce the surface energy and adhesion potential so that the separation is clean without damaging either the mask element or the relief-forming precursor.

The flexographic printing plate assembly having the UV-sensitive layer includes a unique combination of materials so that peeling away of the mask can be quick and complete. By "complete", at least 95% and preferably at least 98%, at least 99%, or 100% of the mask is peeled off, leaving very little or no residual material. The composition of the UV-sensitive layer provides a peel force in relation to a mask element comprising a mask image of less than about 73 g/inch, preferably less than about 60 g/inch, and more preferably less than about 55 g/in). The relief-forming layer may have a peel force relative to the mask that is measurable, such as at least about 1 g/in, at least about 5 g/in, or at least about 10 g/in.

In some embodiments, the relief-forming layer is a solvent washable plate precursor, and includes a peel force in relation to a mask element comprising a mask image of less than about 73 g/inch, preferably less than about 60 g/inch, and more preferably less than about 55 g/inch). The relief-forming layer that is solvent washable may have a peel force relative to the mask that is measurable, such as at least about 1 g/in, at least about 5 g/in, or at least about 10 g/in.

In some embodiments, the relief-forming layer is a water washable plate precursor, and includes a peel force in relation to a mask element comprising a mask image of less than about 40 g/inch, preferably less than about 30 g/inch, and more preferably less than about 20 g/inch). The relief-forming layer that is water washable may have a peel force relative to the mask that is measurable, such as at least about 1 g/in, at least about 5 g/in, or at least about 10 g/in.

This peel force value can be measured in which a 2.54 cm wide by 25.4 cm long strip of mask that is laminated to a UV-sensitive layer having the low surface energy additive of a flexographic printing plate that has been UV exposed is mounted on an IMASS SP-2000 slip/peel tester (IMASS Inc., Accord, Mass.) using double stick tape with the printing plate down. The initial edge of the mask is pulled away from the printing plate and mounted in the force gauge. The maximum peel force in g/linear inch (2.54 cm) width of film is measured at a 180° peel angle and a peel speed of 2 cm/sec.

In some embodiments, the mask element containing the mask image is removed from the UV-exposed UV-sensitive relief-forming layer of the flexographic printing plate precursor by peeling it away at the interface of the mask element and relief-forming layer. This peeling process can be carried out as described in U.S. Pat. No. 7,802,598 using vacuum to hold in place. A corner of the mask element is then pulled away from the printing plate at a rate of 2 to 10 cm/sec at peel angle of 150-180° thereby essentially pulling the imaged film back on itself and keeping the imaged film near the vacuum table surface in a continuous motion until the entire mask element is removed from the UV-sensitive layer of the printing plate. In the practice of this invention, at least 95 weight % of the dry mask element is removed in this operation, so that it can be generally said that the mask element is "completely" or substantially completely removed from the exposed radiation curable layer of the precursor. By "complete", at least 95% and preferably at least 98%, at least 99%, or 100% of the mask is peeled off, leaving very little or no residual material.

Development

After the mask element is removed from the relief-forming layer, the imaged relief-forming precursor is then generally developed with a suitable developer (or processing solution, or "washout solution") to form a relief image. Development serves to remove the non-exposed (uncured) regions of the UV-sensitive layer, leaving the exposed (cured) regions that define the relief image as shown in FIG. 8E, which is obtained from the relief-forming precursor 900 of FIG. 9.

Any known organic solvent-based or aqueous-based developer can be used in this processing step including known developers that contain predominantly chlorinated organic solvents. However, other useful developers are predominantly non-chlorinated organic solvents. By "predominantly," it is meant that more than 50% (by volume) of the developer comprises one or more non-chlorinated organic solvents such as aliphatic hydrocarbons and long chain alcohols (that is alcohols with at least 7 carbon atoms). The remainder of the developers can be chlorinated organic solvents that are known in the art for this purpose.

Certain useful developers are predominantly what are known as "perchloroethylene alternative solvents" (PAS) that are generally volatile organic compounds typically comprised of mixtures of aliphatic hydrocarbons and long-chain alcohols. Examples of such commercially available solvents include but are not limited to, PLATESOLV available from Hydrite Chemical Co. (Brookfield, Wisc.), NYLOSOLV® available from BASF (Germany), FLEXOSOL® available from DuPont (Wilmington, DE), OptiSol® available from DuPont (Wilmington, Del.), and SOLVIT® QD available from MacDermid (Denver, Co.).

Other useful developers are described in U.S. Pat. No. 5,354,645 (Schober et al.), the disclosure of which is incorporated herein by reference, and include one or more of diethylene glycol dialkyl ethers, acetic acid esters or alcohols, carboxylic acid esters, and esters of alkoxy substituted carboxylic acids. Still other useful developers are described in U.S. Pat. No. 6,162,593 (Wyatt et al) described developers comprising diisopropylbenzene (DIPB), and U.S. Pat. No. 6,248,502 (Eklund).

Additional useful developers are described in U.S. Pat. No. 6,582,886 (Hendrickson et al.) and contain methyl esters alone or mixtures of methyl esters and co-solvents such as various alcohols that are soluble in the methyl ester(s). U.S. Patent Application Publication 2010/0068651 (Bradford) describes useful developers containing dipropylene glycol dimethyl ether (DME) alone or in combination with various co-solvents such as alcohols and aliphatic dibasic acid ethers. Still other useful developers are described in U.S. Patent Application Publication 2011/0183260 (Fohrenkamm et al.). Other useful developers are described in U.S. Pat. No. 8,771,925 (Fohrenkamm et al.) which developer includes diisopropylbenzene and one or more organic co-solvents, one of which is an aliphatic dibasic acid ester. Still other useful developers are described in U.S. Pat. No. 9,005,884 (Yawata et al.) which processing solution can include an alkali metal salt of a saturated fatty acid having a carbon number of 12 to 18 and an alkali metal salt of an unsaturated fatty acid having a carbon number of 12 to 18 in a weight ratio of from 20:80 to 80:20 of the first fatty acid salt to the second fatty acid salt.

Still other useful developers are described in U.S. Pat. No. 10,248,025 (011mann et al.). Such flexographic developers can comprise: a) a fatty acid composition consisting of one or more saturated or unsaturated fatty acids or alkali metal salts thereof, each saturated or unsaturated fatty acid or alkali metal salt thereof independently having 12 to 20 carbon atoms, the fatty acid composition being present in an amount of at least 0.25 weight % and up to and including 2.0 weight %, and at least 85 weight % of the fatty acid composition is composed of one or more C18 mono- or poly-unsaturated fatty acids or alkali metal salts thereof; b) an aminopolycarboxylic acid or alkali metal salt thereof in an amount of at least 0.05 weight % and up to and including 0.30 weight %; c) a buffer compound in an amount of at least 05 weight % and up to and including 0.60 weight %; and d) water.

Development can be carried out under known conditions such as for at least 1 minute and up to and including 20 minutes and at a temperature of at least 20° C. and up to and including 32° C. The type of developing apparatus and specific developer that are used will dictate the specific development conditions and can be adapted by a skilled worker in the art.

Post-development processing of the relief image in the imaged relief-forming precursor can be suitable under some circumstances. Typical post-development processing includes drying the relief image to remove any excess solvent and post-curing by exposing the relief image to curing radiation to cause further hardening or crosslinking. The conditions for these processes are well known to those skilled in the art. For example, the relief image can be blotted or wiped dry, or dried in a forced air or infrared oven. Drying times and temperatures would be apparent to a skilled artisan. Post-curing can be carried out using the same type of UV-radiation previously used to expose the relief-forming precursor through the imaged mask material.

Detackification (or "light finishing") can be used if the relief image surface is still tacky. Such treatments, for example, by treatment with bromide or chlorine solutions or exposure to UV or visible radiation, are well known to a skilled artisan.

The resulting relief image can have a depth of at least 2% and up to and including 100% of the original thickness of the UV-sensitive layer (for example, if this layer is disposed on a substrate). For a flexographic printing plate, the maximum dry depth of the relief image can be from at least 150 µm and up to and including 1,000 µm, or typically at least 200 µm and up to and including 500 µm. For a printed circuit board, the UV-sensitive layer can be completely removed in either the exposed or non-exposed regions, to reveal the metal layer underneath. In such elements, the maximum depth of the relief image depends upon the dry thickness of the UV-sensitive layer. Advantageously, in any embodiment, the relief image can have shoulder angles of greater than 50°.

Thus, in some embodiments, the method is carried out where the relief-forming precursor is a UV-sensitive flexographic printing plate precursor and imaging and developing it such precursor to provide a flexographic printing plate that has a relief image layer formed from the relief-forming layer of the relief-forming precursor. Similarly, letterpress printing plates can be prepared from the appropriate precursor elements.

In some embodiments, the relief image layer can receive ink during the process of creating a relief image with the ink, see FIG. 1. The ink can be applied to the relief image layer in a suitable amount that helps the ink have printed dot-gain reduction. Accordingly, the relief image can facilitate reduction of the printed dot-gain. This overcomes an issue with flexographic printing plates having too high printed dot-gain.

In some embodiments, the relief image layer having the ink can be cleaned to remove the ink for various reasons, such as changing color or cleaning the surface to apply new ink. Also, changing the ink can help remove any particles from the relief image layer that may be generated during the process. The cleaning system can be configured to facilitate cleaning of the ink and allow for easier removal of the ink from the features (e.g., elevations, valleys, etc.) of the surface after printing. This provides for a clean relief surface so that the plate can be stored and then used again for printing.

One skilled in the art can readily see the various utilities that such inked elements would have in various industries including the flexographic printing of various packaging materials.

It may also be applicable to packaging produced on other substrates, like carton board, corrugated, or labels using water based, UV cured, or EB cured inks.

EXAMPLES

Definitions

As used herein to define various components of the non-ablatable light-to-heat converting (LTHC) layer, non-silver halide thermally-ablatable imaging layer (IL), and other materials, layers, and compositions (for example, a developer or processing solution) used in the practice of this invention, unless otherwise indicated, the singular forms "a," "an," and "the" are intended to include one or more of the components (that is, including plurality referents).

Each term that is not explicitly defined in the present application is to be understood to have a meaning that is commonly accepted by those skilled in the art. If the construction of a term would render it meaningless or essentially meaningless in its context, the term should be interpreted to have a standard dictionary meaning.

The use of numerical values in the various ranges specified herein, unless otherwise expressly indicated otherwise, are considered to be approximations as though the minimum and maximum values within the stated ranges were both preceded by the word "about." In this manner, slight variations above and below the stated ranges may be useful to achieve substantially the same results as the values within the ranges. In addition, the disclosure of these ranges is intended as a continuous range including every value between the minimum and maximum values as well as the end points of the ranges.

The non-ablatable light-to-heat converting layer is also identified herein as the LTHC layer.

The non-silver halide thermally-ablatable imaging layer is also identified herein as the IL.

Unless indicated herein, the term "imageable material" is used to refer to embodiment articles prepared and used according to the present invention. Such imageable materials can also be known as "mask films," "mask precursors," or "masking elements." The imageable material can be transformed into a "mask element" with suitable thermal (IR) imaging, which mask element contains a mask image that can be used to form a relief image according to the present invention.

Unless otherwise indicated, percentages are by weight.

The term "relief-forming precursor" used herein refers to any imageable element or imageable material in which a relief image can be produced by exposure through a mask element. Examples of such relief-forming precursors are described in detail below but some relief-forming precursors include flexographic printing plate precursors, letterpress printing plate precursors, and printed circuit boards. Details of useful relief-forming materials are described in U.S. Patent Application Publication 2005/0227182 (noted above), the disclosure of which is incorporated herein by reference. In this publication, the relief-forming precursors are generally identified as "radiation-sensitive elements."

Unless otherwise indicated, the term "ablative" or "ablation" refers to thermal imaging by means of a laser that causes rapid local changes in the non-silver halide thermally-ablatable imaging layer (IL) of an imageable material thereby causing the material(s) in the IL to be ejected from the IL. This is distinguishable from other material transfer or imaging techniques such as melting, evaporation, or sublimation.

The terms "optical contact" and "complete optical contact" have the same meaning and refer to two layers or two elements (as in the case of the mask element and a relief-forming precursor) sharing an interface and being in intimate physical contact so that there is essentially no air-gap or void between the contacting surfaces, thus providing an "air-free interface." More precisely, two surfaces are defined as being in optical contact when the reflection and transmission characteristics of their interface are essentially fully described by the Fresnel laws for the reflection and transmission of light at the refractive-index boundary.

Unless otherwise noted, the term "transparent" used herein refers to the ability of a material or layer to transmit at least 95% of impacting (or incident) electromagnetic radiation, such as electromagnetic radiation having a wavelength of at least 200 nm to and including 750 nm (that is, what are generally known in the art as UV and visible radiation). The transparent polymeric carrier sheet and LTHC layer described below particularly have this property.

"Average dry thickness" of a given dry layer is generally an average of 10 different measurements of a dry cross-sectional image of that layer.

A flexographic printing plate highlight region is considered to have microdots of less than 100 microns, less than 90 microns, less than 80 microns, less than 70 microns, less than 60 microns, less than 50 microns, or less than 40 microns, and greater than 35 microns. The dimension of the microdots is the longest dimension of the microdot printhead. The microdots are present 5% or less of the highlight area of the flexographic printing plate. A higher density of over 5% of the area having dots or microdots is not a highlight region.

One skilled in the art will appreciate that, for the processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

All references recited herein are incorporated herein by specific reference in their entirety.

The invention claimed is:

1. A highlight microdot mask element for an image having a highlight region, the highlight microdot mask element comprising:
  a highlight mask region adapted to correspond to the highlight region of the image, wherein the highlight mask region includes a plurality of microdot printhead regions, each microdot printhead region corresponding to a single printed dot in the highlight region of the image, each microdot printhead region comprising:
    an imaged region having a plurality of imaged blocks that are optically transmissive and a plurality of non-imaged blocks that are optically opaque arranged in a highlight microdot print surface pattern for the single printed dot, each imaged region having;
      the plurality of imaged blocks are optically transmissive and arranged to form an outer region;
      at least one opaque island formed within the outer region by a plurality of non-imaged blocks located within the highlight microdot print surface pattern, wherein an arrangement of the plurality of imaged regions and the at least one opaque island defines the highlight microdot print surface pattern; and
    an opaque void region surrounding the highlight microdot pattern formed by a plurality of non-imaged blocks,
    wherein each imaged block or non-imaged block has a height of one pixel and a width of ¼ pixel, each pixel is about 10 microns to about 11 microns in height and width, wherein:
      a width of each imaged region is at least a ¼ pixel;
      a height of each imaged region is at least 1 pixel;

a width of the microdot pattern ranging from 2 pixels to 8 pixels;
a height of the microdot pattern ranging from 3 pixels to 8 pixels;
a width of each internal opaque island is at least a pixel; and
a height of each internal opaque island is at least 1 pixel.

2. The highlight microdot mask element of claim 1, wherein:
a width of the imaged region is at least a ½ pixel;
a height of the imaged region is at least 2 pixels;
the width of the microdot pattern ranging from 2.5 pixels to 4 pixels;
the height of the microdot pattern ranging from 4 pixels to 6 pixels;
a width of at least one internal opaque island is at least a ½ pixel; and
a height of at least one internal opaque island is at least 2 pixels with each non-imaged block touching another imaged block by at least a ¼ pixel.

3. The highlight microdot mask element of claim 1, comprising:
the imaged region forms at least one outer boundary region of an outer boundary pattern, each outer boundary region having at least one imaged block and being optically transmissive;
the at least one internal opaque island is formed by at least one non-imaged block located within the outer boundary pattern;
the opaque void region surrounds the outer boundary pattern,
wherein each imaged block or non-imaged block has a height of one pixel and a width of ¼ pixel, each pixel is about 10 microns to about 11 microns in height and width.

4. The highlight microdot mask element of claim 3, comprising:
the at least one outer boundary pixel regions form a continuous annular boundary region with each imaged block touching another imaged block by at least a corner; or
a plurality of the outer boundary pixel regions form a discontinuous annular boundary region with at least one gap non-imaged block between two adjacent imaged blocks of the plurality of outer boundary pixel regions.

5. The highlight microdot mask element of claim 3, wherein:
a width of each outer boundary pixel region is at least a ¼ pixel;
a height of each outer boundary pixel region is at least 1 pixel;
a width of the outer boundary pattern ranges from 2 pixels to 8 pixels;
a height of the outer boundary pattern ranges from 3 pixels to 8 pixels;
a width of each internal opaque island is at least a ¼ pixel; and
a height of each internal opaque island is at least 1 pixel.

6. The highlight microdot mask element of claim 5, wherein:
a width of at least one outer boundary pixel region is at least a ½ pixel;
a height of at least one outer boundary pixel region is at least 2 pixels;
a width of the outer boundary pattern ranges from 2.5 pixels to 4 pixels;
a height of the outer boundary pattern ranges from 4 pixels to 6 pixels;
a width of at least one internal opaque island is at least a ½ pixel; and
a height of at least one internal opaque island is at least 2 pixels with each non-imaged block touching another non-imaged block by at least a ¼ pixel.

7. The highlight microdot mask element of claim 3, each imaged region comprising at least one of:
a single internal opaque island within a continuous annular boundary region;
a single internal opaque island within a discontinuous annular boundary region;
a plurality of internal opaque island within a continuous annular boundary region; or
a plurality of internal opaque islands within a discontinuous annular boundary region.

8. The highlight microdot mask element of claim 3, comprising at least one of:
a single internal imaged region within a continuous annular boundary region;
a single internal imaged region within a discontinuous annular boundary region;
a plurality of internal imaged regions within a continuous annular boundary region; or
a plurality of internal imaged regions within a discontinuous annular boundary region.

9. The highlight microdot mask element of claim 1, each imaged region comprising at least one of:
at least 20 total blocks;
at least 16 imaged blocks in the pattern;
at least 4 non-imaged blocks in the at least one internal opaque island; or
at least 20% of total blocks are non-imaged blocks.

10. The highlight microdot mask element of claim 3, comprising:
one or more outer boundary regions that together form an optically transmissive ring;
at least one internal opaque island formed by a plurality of non-imaged blocks located within the optically transmissive ring, the internal opaque island having an island width of at least ½ pixel and an island height of at least 2 pixels; and
the opaque void region surrounding the optically transmissive ring.

11. A mask for highlight-producing flexographic printing plates, comprising:
the highlight microdot mask element of claim 1; and
an image pattern having the highlight mask region.

12. The mask for highlight-producing flexographic printing plates of claim 11, comprising:
a highlight microdot region of an imaged material with a thermally-ablatable imaging layer having the imaged blocks and non-imaged blocks that are arranged to form a printing highlight microdot pattern on a single highlight microdot structure, the single highlight microdot structure comprising the highlight microdot mask element.

13. A mask for highlight-producing flexographic printing plates, comprising:
the highlight microdot mask element of claim 3, and
an image having the highlight mask region.

14. The mask for highlight-producing flexographic printing plates of claim 13, comprising:

an optically transmissive ring formed by the plurality of imaged blocks with a thickness of the ring being at least a ¼ pixel and an orthogonal thickness of at least 1 pixel, a ring height ranging from 3 pixels to 8 pixels, and a ring width ranging from 1 pixels to 8 pixels, the at least one internal opaque island formed by a plurality of non-imaged blocks located within the optically transmissive ring, the internal opaque island having an island height of at least 1 pixel and an island width of at least 1 pixel; and the opaque void region surrounds the optically transmissive ring.

15. The mask for highlight-producing flexographic printing plates of claim 11, comprising:

an imaged material with a thermally-ablatable imaging layer having imaged blocks and non-imaged blocks that are arranged to form the image pattern, the image pattern includes at least one highlight mask region that has a plurality of highlight dot regions that form a highlight pattern in the image pattern, the highlight mask region includes a plurality of opaque regions of the thermally-ablatable imaging layer, each opaque region being one or more non-imaged blocks, and the highlight mask region includes a plurality of optically-transmissive regions in the thermally-ablatable imaging layer, each optically-transmissive region being one or more imaged blocks, wherein each highlight dot region includes at least one highlight microdot mask element.

16. The mask for highlight-producing flexographic printing plates of claim 15, comprising:

an optically transmissive ring formed by a plurality of imaged blocks with a thickness of the ring being at least a ¼ pixel, a ring height ranging from 4 pixels to 8 pixels, and a ring width ranging from 2 pixels to 8 pixels;

an internal opaque island formed by a plurality of non-imaged blocks located within the optically transmissive ring, the internal opaque island having an island width of at least 1 pixel and an island height of at least 2 pixels; and an opaque void region surrounding the optically transmissive ring formed by a plurality of non-imaged blocks.

* * * * *